United States Patent [19]

Andow et al.

[11] Patent Number: 4,507,700
[45] Date of Patent: Mar. 26, 1985

[54] PROTECTIVE RELAYING SYSTEM

[75] Inventors: Fumio Andow, Hachiohji; Yuji Okita, Tokyo; Noriyoshi Suga, Fuchu, all of Japan

[73] Assignee: Tokyo Shibaura Denki Kabushiki Kaisha, Kawasaki, Japan

[21] Appl. No.: 428,408

[22] Filed: Sep. 29, 1982

[30] Foreign Application Priority Data

Sep. 29, 1981 [JP] Japan .................. 56-154236

[51] Int. Cl.³ ............................................. H02H 3/26
[52] U.S. Cl. ........................................ 361/80; 364/482
[58] Field of Search .................... 361/78–80, 361/82–87; 364/482, 483, 492

[56] References Cited

U.S. PATENT DOCUMENTS

| | | | |
|---|---|---|---|
| 4,148,087 | 4/1979 | Phadke | 361/80 |
| 4,212,046 | 7/1980 | Andow et al. | 361/80 |
| 4,276,605 | 6/1981 | Okamoto et al. | 361/86 X |
| 4,286,303 | 8/1981 | Genheimer et al. | 361/24 |
| 4,319,298 | 3/1982 | Davis et al. | 361/27 X |
| 4,333,151 | 6/1982 | Matsushima | 361/80 X |
| 4,365,302 | 12/1982 | Elms | 364/483 |
| 4,377,833 | 3/1983 | Udren | 361/80 X |
| 4,420,805 | 12/1983 | Yamaura et al. | 361/79 X |

*Primary Examiner*—Harry E. Moose, Jr.
*Attorney, Agent, or Firm*—Oblon, Fisher, Spivak, McClelland & Maier

[57] ABSTRACT

A protective relaying system is disclosed which detects a fault in an electric power system having a circuit breaker by using a current and a voltage of the electric power system. The protective relaying system includes an input conversion/unit adapted to receive a first and a second input signals corresponding to said current and voltage, for converting the magnitude and/or the phase of the first and second input signals to produce least two electrical quantities a first electrical quantity and a third electrical quantity, and for outputting the second input signal without conversion as a second electrical quantity.

The protective relaying system also includes a comparing unit connected to receive first, second and third electrical quantities from the input conversion unit for comparing the first and second electrical quantities to produce a first logical state and comparing the third and fourth electrical quantities to produce a second logical state signal cyclically. The protective relaying system further includes a digital data processing unit for judging whether a specified logical condition between the first and second logical state signals holds for a predetermined number of times corresponding to a predetermined electrical angle, and for producing a protection relay output signal based on the judging result. The protection relay output signal is adapted for using to trip the circuit breaker.

26 Claims, 48 Drawing Figures

(a)

(b)

PROTECTIVE RELAYING SYSTEM

BACKGROUND OF THE INVENTION

1. Field of the Invention

This invention relates generally to a protective relaying system and more particularly to a protective relaying system provided with a digital processing unit for a relay calculation unit.

2. Description of the Prior Art

Hitherto, protective relays have been classified, according to operation principle, into an electromechanical type relay, a static type relay, and a digital type relay.

The electromechanical type relay drives a movable portion by means of flux of magnetic force or electromagnetic force, and opens and closes output contacts by movement of the movable portion.

The static type relay comprises a transistor circuit wherein comparisons of electrical quantities with one another in terms of magnitude and phases thereof are made, and produces an output in accordance with the thus compared result.

The digital type relay has such functions as to sample, with certain specified intervals, electrical quantities indicative of voltages and currents derived from respective phases of a power system to be protected, to hold the respective sampled values, to sequentially rearrange the same by means of a multiplexer, to convert the rearranged electrical quantities into digital quantities by utilizing an analog-to-digital converter, and to process these digital quantities within a digital processing unit on the basis of predetermined relay calculation programs.

The static type relay, most commonly used of the three, will be described with reference to the accompanying drawings.

FIG. 1 is a diagram of principle structure illustrating a static-type mho characteristic distance relay (hereinafter, simply called a mho relay) in a single phase. In FIG. 1, a potential transformer PT and a current transformer CT installed at the terminal of a transmission line TL to be protected transform voltage and current of the transmission line TL, and respectively output a voltage $\dot{V}$ and a current $\dot{I}$ in the secondary thereof. Here, V and I indicate a voltage vector and a current vector, respectively. The voltage $\dot{V}$ and the current $\dot{I}$ are respectively inputted to an input conversion unit 100, wherein the inputted electrical quantities are converted into various electrical quantities such as $\dot{I}\dot{Z}$, $\dot{V}_p$ and $\dot{V}$ required for mho relay calculation, and outputted to a relay-operation judging unit 200.

A vector synthesizing circuit AD in the input conversion unit 100 multiplies the inputted current $\dot{I}$ by a simulated impedance Z which simulates the line impedance of the transmission line TL so as to output an electrical quantity $\dot{I}\dot{Z}$. Here, the phase of the electrical quantity $\dot{I}\dot{Z}$ leads the phase of the current $\dot{I}$ by a line impedance angle (an angle $\angle Z$). ME represents a storage circuit which receives the voltage $\dot{V}$ and outputs an electrical quantity $\dot{V}_p$ as a polar quantity. The storage circuit ME, which is comprised of, for example, a series resonance circuit, produces the electrical quantity $\dot{V}_p$ of damped oscillation so that even in case the input voltage abruptly becomes zero due to occurrence of extremely close fault, the system can maintain a proper direction judgement for a period of a few cycles.

Next, in the relay-operation judging unit 200, a comparator 1 receives the electrical quantity $\dot{I}\dot{Z}$ at the positive input terminal, and the electrical quantity $\dot{V}$, at the negative input terminal, respectively. The comparator 1 outputs a logical state "1" when an instantaneous value of ($\dot{I}\dot{Z}$-$\dot{V}$) is greater than zero, and when smaller than zero, then outputs a logical state "0", respectively. A comparator 2 similarly receives the electrical quantity $\dot{V}_p$ at the positive input terminal, and a DC reference electrical quantity such as zero volts, at the negative input terminal, respectively. The DC reference electrical quantity is necessarily limited to zero volts, and it may contain a certain amount of DC bias quantity so as to prevent misoperations of the relay-operation judging unit 200 when no signal is inputted thereto. The logical state output signals from the comparators 1 and 2 are inputted to an AND circuit 3, wherein an overlapped angle $\theta$ (overlapped time) of the phases of the inputted signals is detected, and a logical state signal corresponding to the overlapped angle $\theta$ is outputted. A time-measuring circuit 4, which is comprised of an ON-delay timer, outputs a logical state "1" when the period during which the logical state signal "1" outputted from the AND circuit 3 remains is greater than a predetermined period, such as a period corresponding to an electrical angle of 90°. The logical state output "1" of the time-measuring circuit 4 indicates that the mho relay is operative, while "0", the mho relay is inoperative. The logical state output signal is used to trip a circuit breaker CB provided in the transmission line TL.

FIG. 2 shows a characteristic diagram of the relay shown in FIG. 1, which indicates that when an angle $\theta$ defined by the electrical quantities ($\dot{I}\dot{Z}$-$\dot{V}$) and $\dot{V}_p$ is less than 90°, that is, when the head of the electrical quantity V lies within the circular area, the relay is operated.

The foregoing description has been made for a single phase of the mho relay, however, for protection of a three-phase circuit, three relays of identical principle and rating should be utilized.

In the case of the mho relay, when an operative region is attempted to extend, a load impedance caused by tidal current can possibly penetrate the operative region of the relay.

In such case, an ohm-characteristic distance relay (hereinafter, simply called an ohm relay) which functions as a blinder is utilized together with the mho relay so as to prevent the ultimate output from being produced in the relay system.

FIG. 3 shows a characteristic diagram of the ohm relay, which indicates that when an angle $\theta$ defined by the electrical quantities ($\dot{I}\dot{Z}_r$-$\dot{V}$) and $\dot{I}\dot{Z}_R$ is less than 90°, the relay is to be operated. Here, the principle structure diagram of the ohm relay is not shown, however, it is equal to that of the mho relay shown in FIG. 1 except that the comparators 1 and 2 receive the input electrical quantities $\dot{I}\dot{Z}_r$ and $\dot{I}\dot{Z}_R$ instead of the input electrical quantities $\dot{I}\dot{Z}$ and $\dot{V}_P$, respectively.

In a conventional static-type protective relay system, mho relays and ohm relays are individually constituted by separate circuits, and such relays are required to be installed on respective phases, thus, the system has become inevitably bulky in scale, and also involved in disadvantages such as inefficient maintenance, inspections and cost thereof.

SUMMARY OF THE INVENTION

Accordingly, the first object of this invention is to provide a protective relaying system of smaller in system scale by commonly using hardwares of plural protective relay components which are identical or similar in fundamental structure principle.

The second object of this invention is to provide a protective relaying system provided with such functions of plural distance relay components as to judge, by utilizing electrical quantities indicative of voltages and currents derived from an electrical power system to be protected, whether the calculated electrical quantities reside within a specified protective region.

The third object of this invention is to provide a protective relaying system which processes on the basis of simplified digital procedures derived from analog calculations on plural electrical quantities required for a plurality of distance relay components.

These and other objects of this invention are achieved by a protective relaying system which detects a fault in an electric power system having a circuit breaker by using a current and a voltage of the electric power system and causes the circuit breaker to trip in accordance with the fault detection so as to protect the electric power system.

The protective relaying system includes an input conversion unit adapted to receive a first input signal corresponding to the current and a second input signal corresponding to the voltage, for converting the magnitude and/or the phase of the first and second input signals to produce a first electrical quantity and a third electrical quantity, and for outputting the second input signal without conversion as a second electrical quantity.

The protective relaying system also includes a comparing unit connected to receive the first, second and third electrical quantities for comparing the first electrical quantity with the second electrical quantity to produce a first logical state signal based on a first comparing result and comparing the third electrical quantity with a fourth electrical quantity to produce a second logical state signal based on a second comparing result cyclically, and for producing a logical state signal including the first and second logical state signals, cyclically.

The protective relaying system further includes a digital data processing unit connected to receive cyclically the logical state signal, for judging whether a specified logical condition between the first logical state signal and the second logical state signal holds for a predetermined number of times corresponding to a predetermined electrical angle during one cycle of the electric power system and for producing a protection relay output signal based on the judging result. The protection relay output signal is adapted to trip the circuit breaker.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIGS. 39(i) through 39(iii) are waveform diagrams illustrating operational characteristics of the microcomputer circuit shown in FIG. 36;

DESCRIPTION OF THE PREFERRED EMBODIMENTS

Figure 4:
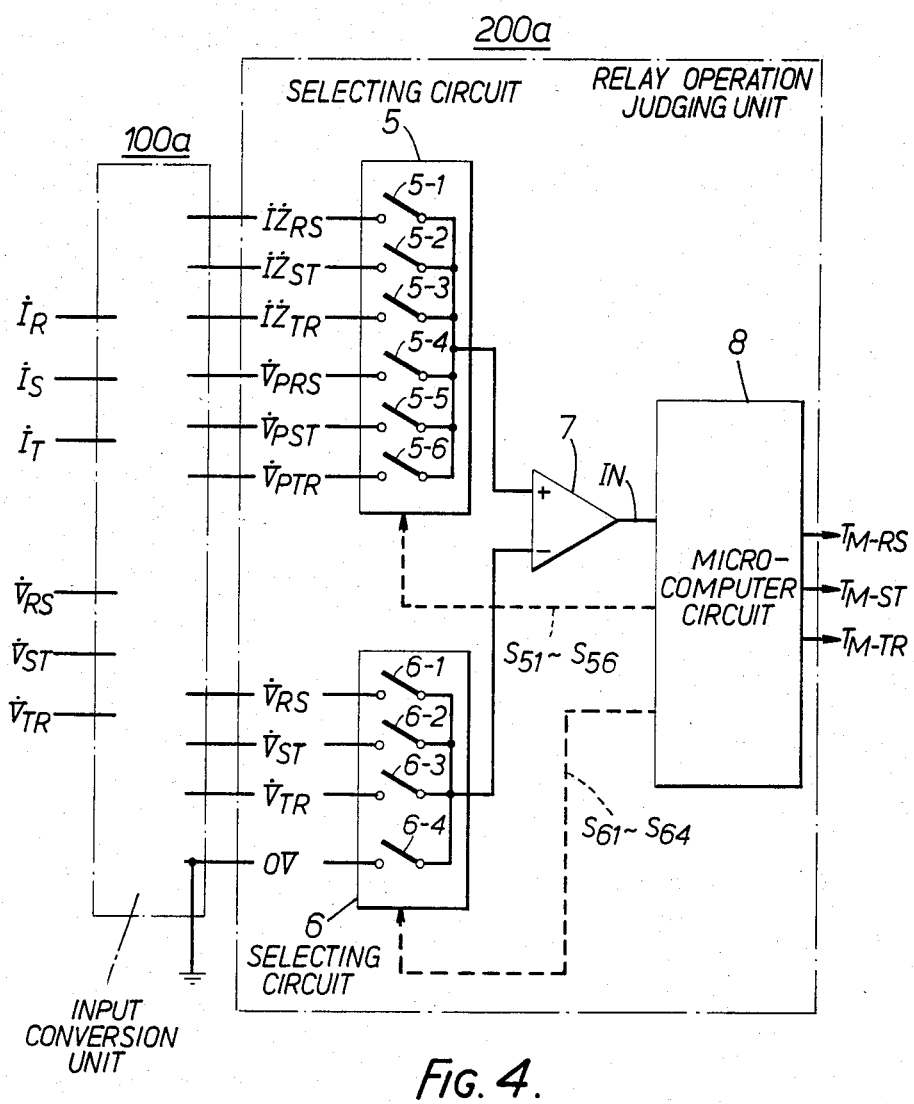
FIG. 4 is a block diagram illustrating a three-phase mho characteristic short-circuit relay of an embodiment of this invention.

Referring now to the drawings, wherein like reference numerals designate identical or corresponding parts throughout the several views, and more particularly to FIG. 4 thereof, there is shown a block diagram illustrating one embodiment of a protective relaying system according to the present invention. This embodiment is provided with functions of three mho relay components which protect transmission lines from short-circuit failures.

Figure 1:
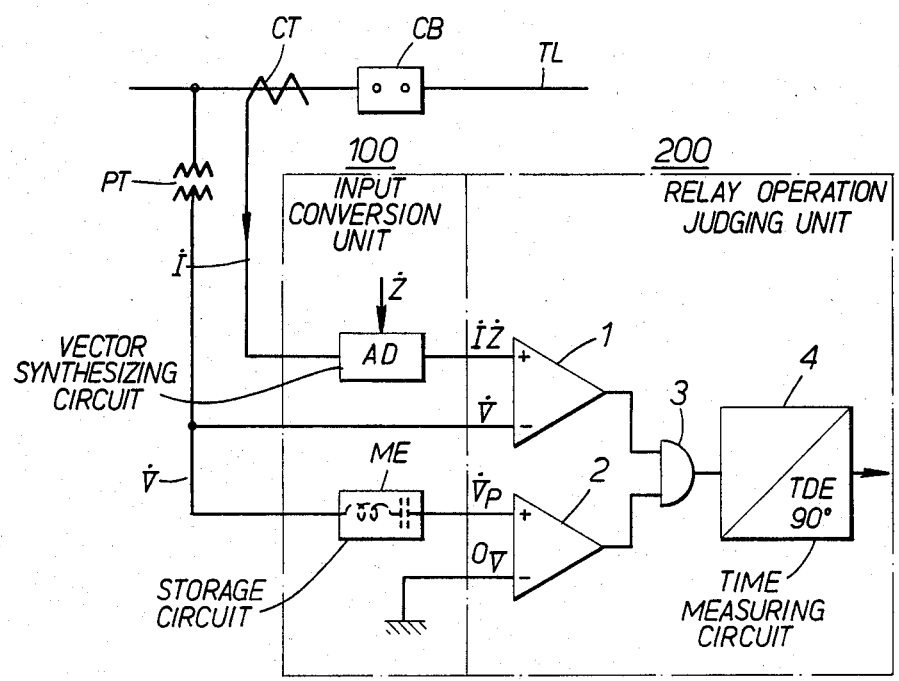
FIG. 1 is a diagram illustrating principle structures of the conventional static-type mho characteristic distance relay.

In FIG. 4, an input conversion unit 100a, which is comprised in the same manner as that shown in FIG. 1, receives currents of respective phases $\dot{I}_R$, $\dot{I}_S$ and $\dot{I}_T$, and interphase voltages $\dot{V}_{RS}$, $\dot{V}_{ST}$ and $\dot{V}_{TR}$, respectively derived from a power system. The input conversion system 100a calculates and outputs plural electrical quantities such as $\dot{I}\dot{Z}_{RS}$, $\dot{I}\dot{Z}_{ST}$, $\dot{I}\dot{Z}_{TR}$, $\dot{V}_{PRS}$, $\dot{V}_{PST}$ and $\dot{V}_{PTR}$ on the basis of well-known calculation procedures, while at the same time, outputs the interphase voltages $\dot{V}_{RS}$, $\dot{V}_{ST}$ and $\dot{V}_{TR}$ without variations in magnitude and phases thereof, and outputs zero volts (hereinafter written simply as 0V). Here, the characters marked with dots represent vector quantities, and $\dot{I}\dot{Z}_{RS}$, $\dot{I}\dot{Z}_{ST}$ and $\dot{I}\dot{Z}_{TR}$ are electrical quantities indicative of currents which lead the respective currents ($\dot{I}_R - \dot{I}_S$), ($\dot{I}_S - \dot{I}_T$) and ($\dot{I}_T - \dot{I}_R$) (where, $\dot{I}_R$, $\dot{I}_S$ and $\dot{I}_T$ represent the line currents on R-phase, S-phase and T-phase, respectively) by the line impedance angle, and $\dot{V}_{PRS}$, $\dot{V}_{PST}$ and $\dot{V}_{PTR}$ are electrical quantities which are expected to be polar quantities proportional to the respective line voltages. The plural electrical quantities $\dot{I}\dot{Z}_{RS}$, $\dot{I}\dot{Z}_{ST}$ . . . $\dot{V}_{TR}$ and zero volts outputted from the input conversion unit 100a are classified into a first group and a second group, and inputted to the relay-operation judging unit 200a. The electrical quantities $\dot{I}\dot{Z}_{RS}$ . . . $\dot{V}_{PTR}$ of the first group are inputted to a selecting circuit 5, while the electrical quantities $\dot{V}_{RS}$ . . . $\dot{V}_{TR}$ and zero volts of the second group, to a selecting circuit 6, respectively. The selecting circuits 5 and 6 are provided with respective groups of switching elements such as 5-1 . . . 5-6 and 6-1 . . . 6-4, and when selecting signals in group S51 . . . S56 and S61 . . . S64 outputted from a digital processing unit 8 (described later in detail) are selectively supplied to the switching elements, the respective switching elements corresponding to the respective selecting signals are caused to close. This results in that the selecting circuits 5 and 6 can select the electrical quantities which have been applied to the respective switching elements, in accordance with the selecting signals from the digital processing unit 8.

A comparator 7 is constructed in the same manner as the comparators 1 and 2 shown in FIG. 1, and the positive input terminal thereof is connected to the output terminal of the selecting circuit 5, then the negative input terminal thereof, to the output terminal of the selecting circuit 6, respectively. The comparator 7 receives the electrical quantities outputted from the selecting circuits 5 and 6, and compares the same, then outputs thus compared result as a logical state signal.

Reference numeral 8 designates a microcomputer circuit which is utilized as the digital processing unit. The microcomputer circuit 8 has such functions, in brief, as follows; to selectively control the selecting circuits 5 and 6 in a predetermined sequence, to receive and store temporarily the output signal of the comparator 7, which is derived from the result of selection of the selecting circuits 5 and 6, to process the temporarily stored signal in digital procedures, and to judge whether the relay is to be operated. Naturally, the series of operations are executed in accordance with the programs stored previously within the microcomputer circuit 8.

In FIG. 4, $T_{M-RS}$, $T_{M-ST}$ and $T_{M-TR}$ represent respectively the relay-operation judging outputs of the respective phases.

Nextly, the operations of the first embodiment according to the present invention will be described. First, the method in which the microcomputer circuit 8 controls the selecting circuits 5 and 6 over R-S phase, and receives a logical state signal from the comparator 7 will be described.

The microcomputer circuit 8 controls the switching element 5-1 of the selecting circuit 5 so as to select the electrical quantity $\dot{I}\dot{Z}_{RS}$, while at the same time, controls the switching element 6-1 of the selecting circuit 6 so as to select the electrical quantity $\dot{V}_{RS}$. As a result, the comparator 7 receives the electrical quantities $\dot{I}\dot{Z}_{RS}$ and $\dot{V}_{RS}$ at the positive and negative input terminals thereof, respectively, and outputs a logical state "1" when (instantaneous value of $\dot{I}\dot{Z}_{RS}$)>(instantaneous value of $\dot{V}_{RS}$), and when (instantaneous value of $\dot{I}\dot{Z}_{RS}$)$\leq$(instantaneous value of $\dot{V}_{RS}$), then outputs a logical state "0". This output signal is temporarily defined as $A_{RS}(1)$. The output signal $A_{RS}(1)$ is received in synchronism with the selecting signals by the microcomputer circuit 8. Next, similarly the microcomputer circuit 8 controls the switching elements 5-4 and 6-4 so as to select the electrical quantities $\dot{V}_{PRS}$ and zero volts, respectively. Under this condition, the output of the comparator 7 becomes a logical state "1" when (instantaneous value of $\dot{V}_{PRS}$)>0V, and when (instantaneous value of $\dot{V}_{PRS}$)$\leq$0V, then becomes a logical state "0". This output signal is temporarily defined as $B_{RS}(1)$. The output signal $B_{RS}(1)$ is also received in synchronism with the selecting signal by the microcomputer circuit 8.

Subsequently, signals $A_{ST}(1)$ and $B_{ST}(1)$ on S-T phase, and $A_{TR}(1)$ and $B_{TR}(1)$ on T-R phase are respectively received in the same manner as described above.

Furthermore, the cyclic repetitions of such control enable the microcomputer circuit 8 to receive the signals such as $A_{RS}(2)$, $B_{RS}(2)$, $A_{ST}(2)$, $B_{ST}(2)$, $A_{TR}(2)$, $B_{TR}(2)$, $A_{RS}(3)$, $B_{RS}(3)$ . . . $B_{TR}(3)$. Here (1), (2) and (3) indicate the numbers of selecting cycles created by the microcomputer circuit 8 respectively. The sequencial signals can be obtained in synchronism with the operations of the selecting circuits 5 and 6, so that from these sequential signals, serial signals {$A_{RS}(i)$}, {$B_{RS}(i)$}, {$A_{ST}(i)$}, {$B_{ST}(i)$}, {$A_{TR}(i)$} and {$B_{TR}(i)$}, (where, i=1, 2 . . . ) can be readily obtained by using the conventional method.

In this embodiment, the serial signals are processed in digital procedure so as to judge whether the relay is to be operated.

Now, with attention to R-S phase, the operations thereof will be described, hereinafter.

The signal $A_{RS}(i)$, as described above, becomes a logical state "1" when (instantaneous value of $I\dot{Z}_{RS}$)>(instantaneous value of $\dot{V}_{RS}$), that is, when (instantaneous value of $(I\dot{Z}_{RS}-\dot{V}_{RS})$)>OV. The signal $B_{RS}(i)$, as described above, becomes a logical state "1" when (instantaneous value of $\dot{V}_{PRS}$)>OV. This causes the logical product $A_{RS}(i)\cdot B_{RS}(i)$ to become "1" when both the instantaneous values of the electrical quantities $(I\dot{Z}_{RS}-\dot{V}_{RS})$ and $\dot{V}_{PRS}$ are positive.

Therefore, checking the number of logical states "1" in the series signals $\{A_{RS}(i)\cdot B_{RS}(i)\}$ can judge whether a phase angle defined by the electrical quantities $(I\dot{Z}_{RS}-\dot{V}_{RS})$ and $\dot{V}_{PRS}$ holds a predetermined relationship.

Namely, assuming that the serial signals $\{A_{RS}(i)\cdot B_{RS}(i)\}$ are obtained at every electrical angle of 1°, for example, by checking whether the serial signals consecutively maintain logical state "1" for more than or equal to 90 times, it can be judged whether a phase difference between the electrical quantities $(I\dot{Z}_{RS}-\dot{V}_{RS})$ and $\dot{V}_{PRS}$ lies within an electrical angle of 90°.

Figure 2:
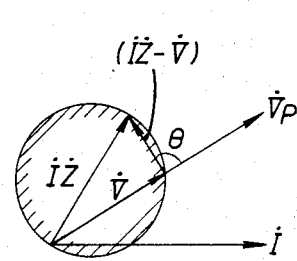
FIG. 2 is a characteristic diagram of the relay shown in FIG. 1.
Figure 3:
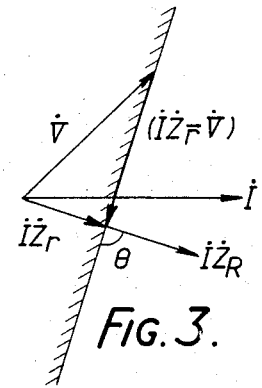
FIG. 3 is a characteristic diagram of ohm characteristic distance relays.

In this case, it is obvious that the characteristics of the relay will be mho characteristics, the same as those shown in FIG. 2.

Figure 5:
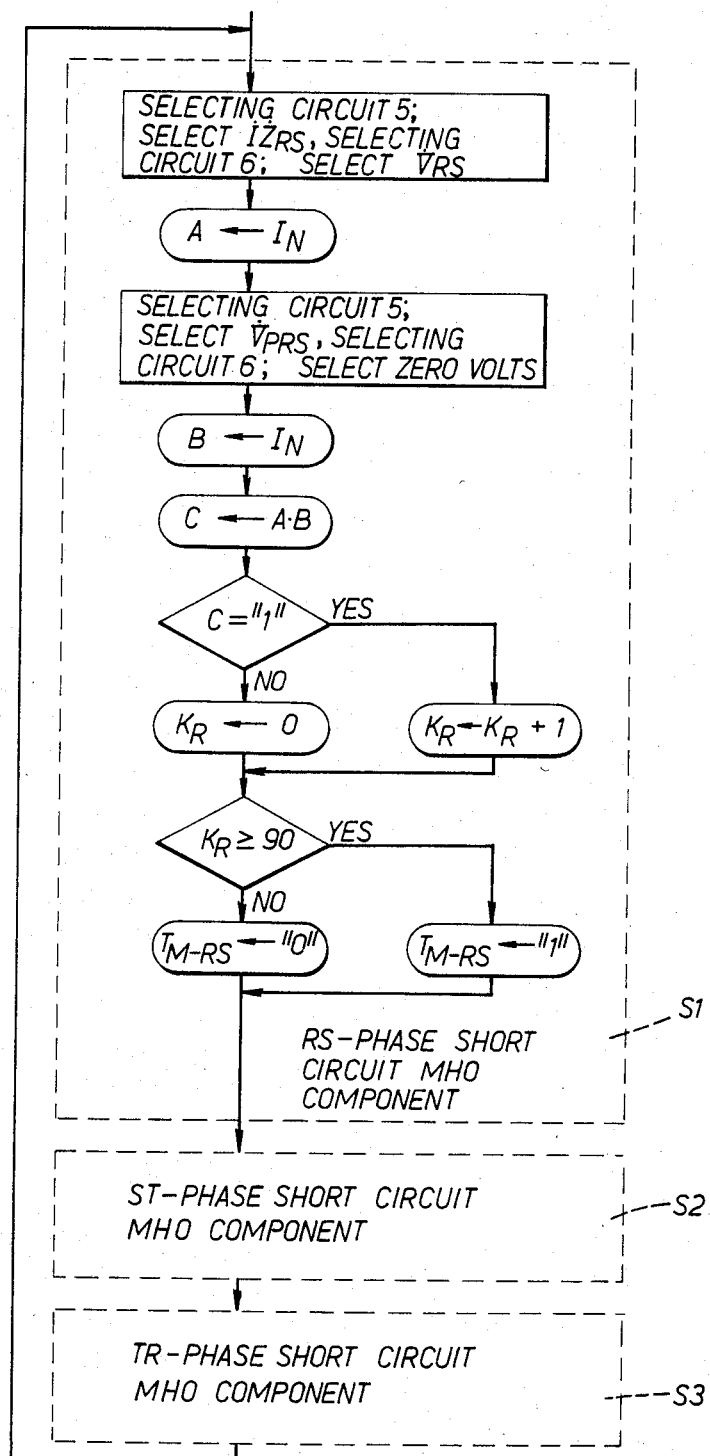
FIG. 5 and FIG. 6 are flowcharts illustrating operations of the microcomputer circuit shown in FIG. 4.

FIG. 5 is a flowchart illustrating the operations of the microcomputer circuit 8. In this flowchart, the operations which are not directly relevant to judging of relay operation such as initialization of the microcomputer circuit 8 are omitted.

In STEP(S1) as shown in FIG. 5, the microcomputer circuit 8 causes the selecting circuit 5 to select the electrical quantity $I\dot{Z}_{RS}$, and the selecting circuit 6, the electrical quantity $\dot{V}_{RS}$, respectively. As a result, an input signal $I_N$ of the microcomputer circuit 8 becomes $A_{RS}(i)$, and this signal is transferred to a register A. Next, the procedure causes the selecting circuit 5 to select the electrical quantity $\dot{V}_{PRS}$, and the selecting circuit 6, zero volts, respectively. The result causes the input signal $I_N$ of the microcomputer circuit 8 to be $B_{RS}(i)$, and this signal is transferred to the register B. Next, the logical product of the stored contents of registers A and B, $A_{RS}(i)\cdot B_{RS}(i)$ is obtained, and the result is transferred to a register C. Here, in the case when a logical product holds, the case is defined as C="1", and in the case when a logical product does not hold, then the case is defined as C="0". Nextly, when the stored content of register C is in "0", the procedure causes the count of counter $K_R$ to be 0, and when the stored content of register C is "1", the procedure adds 1 to the count of the counter $K_R$. Next, when the count of the counter $K_R$ is greater than or equal to a predetermined count, such as 90, the procedure causes the output $T_{M-RS}$ to be "1", and when less than 90, then causes the output $T_{M-RS}$ to be "0".

Here, the number 90 indicates the number determined from the relationship between an electrical angle of 90° and the number of times of executions in STEP(S1) per an electrical angle of 1° in the foregoing description. Specifically, when an electrical angle is predetermined as of 90° and STEP(S1) through STEP(S3) are executed at a rate of one time per an electrical angle of 1°, by checking whether the count of the counter $K_R$ is greater than or equal to 90, it can be judged that whether the phase difference between the two electrical quantities $(I\dot{Z}_{RS}-\dot{V}_{RS})$ and $\dot{V}_{PRS}$ is less than 90°.

Therefore, provided STEP(S1) be executed at a rate of one time per an electrical angle of 0.5°, an electrical angle of 90° would correspond to the count of 180 in the counter $K_R$. Namely, the present invention is not limited to the correlation such as electrical angle of 1° and the count of 90. Here, in STEP(S1), steps following the box discriminating whether the content of the register C is "1" or not is temporarily defined as a phase detection subroutine.

The operations of STEP(S2) and STEP(S3) are respectively identical to those of STEP(S1) except that the electrical quantities on R-S phase are substituted by those on S-T phase and T-R phase, respectively. The microcomputer circuit 8 cyclically repeats the procedures of STEP(S1), STEP(S2) and STEP(S3).

Figure 6:
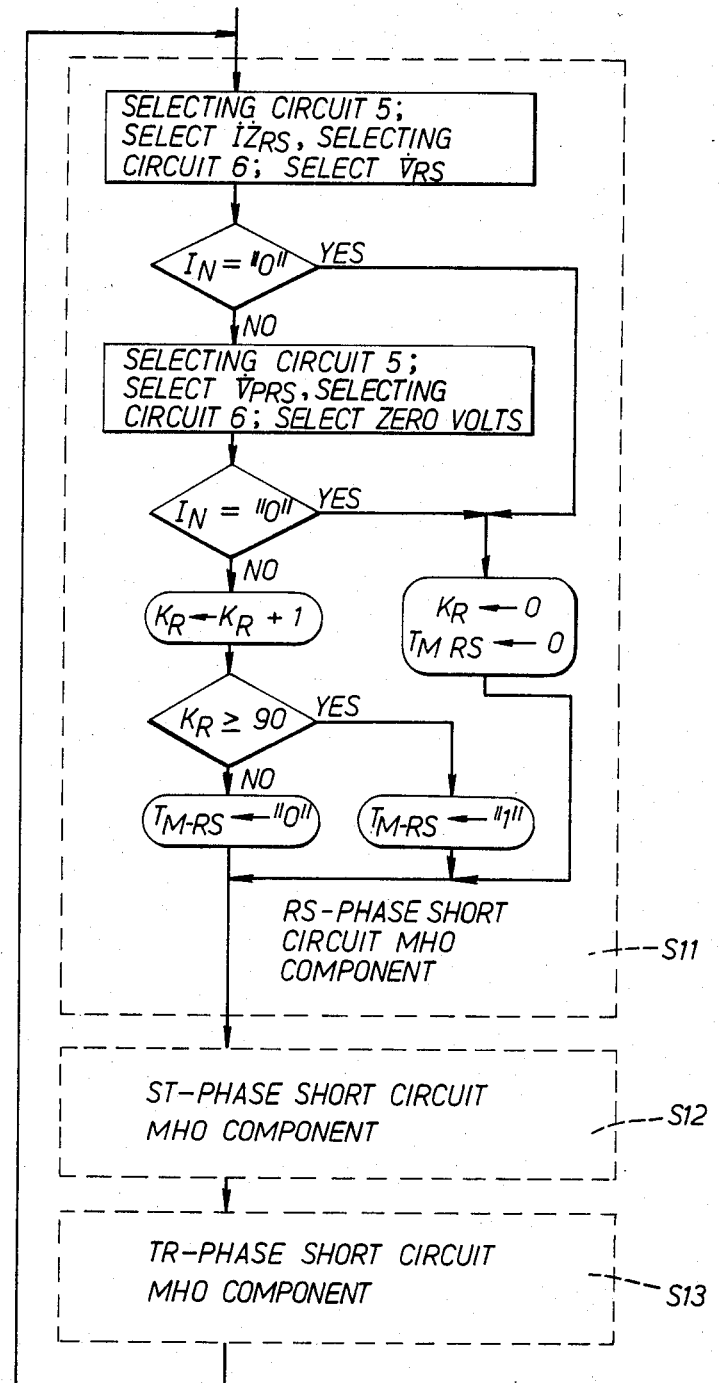

FIG. 6 illustrates the operations of the microcomputer circuit 8 in another example as in a flowchart. In the flowchart, the operations which are not directly relevant to the relay-operation judgment such as initialization of the microcomputer circuit 8 are also omitted.

In STEP(S11) as shown in FIG. 6, the microcomputer circuit 8 causes the selecting circuits 5 and 6 to select the electrical quantities $IZ_{RS}$ and $V_{RS}$, respectively, and as a result, receives the signal $A_{RS}(i)$ as the input signal $I_N$. When this signal is "0", the procedure causes the count of counter $K_R$ to be 0, causes the output $T_{M-RS}$ to be "0", and executes the following STEP(S12). On the other hand, when the input signal $I_N$ is "1", the microcomputer circuit 8 causes the selecting circuit 5 to select the electrical quantity $V_{PRS}$, and the selecting circuit 6, zero volts, respectively. This result develops the signal $B_{RS}(i)$ on the input signal $I_N$. When this signal is "0", the procedure causes the count of counter $K_R$ to be 0, causes the output $T_{M-RS}$ to be "0", and executes the following STEP(S12). When the input signal $I_N$ is "1", the procedure adds 1 to the count of the counter $K_R$, and when the count of the counter $K_R$ is greater than or equal to 90, the procedure causes the output $T_R$ to be "1", and when less than 90, causes the output $T_R$ to be "0".

The operations of STEP(S12) and STEP(S13) are respectively identical to those of STEP(S11) except that the electrical quantities on the R-S phase are substituted by those on the S-T phase and the T-R phase, respectively. The microcomputer circuit 8 repeatedly executes the procedures of STEP(S11) STEP(S12) and STEP(S13).

FIGS. 7(a), 7(b) and 7(c) show characteristic diagrams of the embodiment shown in FIG. 4. Naturally, the characteristics are identical to those in both the flowcharts in FIGS. 5 and 6, and are also not limited to those in FIGS. 5 and 6.

As described above, according to the embodiment of the present invention, plural relays which are identical to each other in fundamental principle structure and installed on respective phases can be substituted by a single relay with the above-described simplified structure, therefore, the protective relaying system can effectively achieve reduction in system scale.

Figure 8:
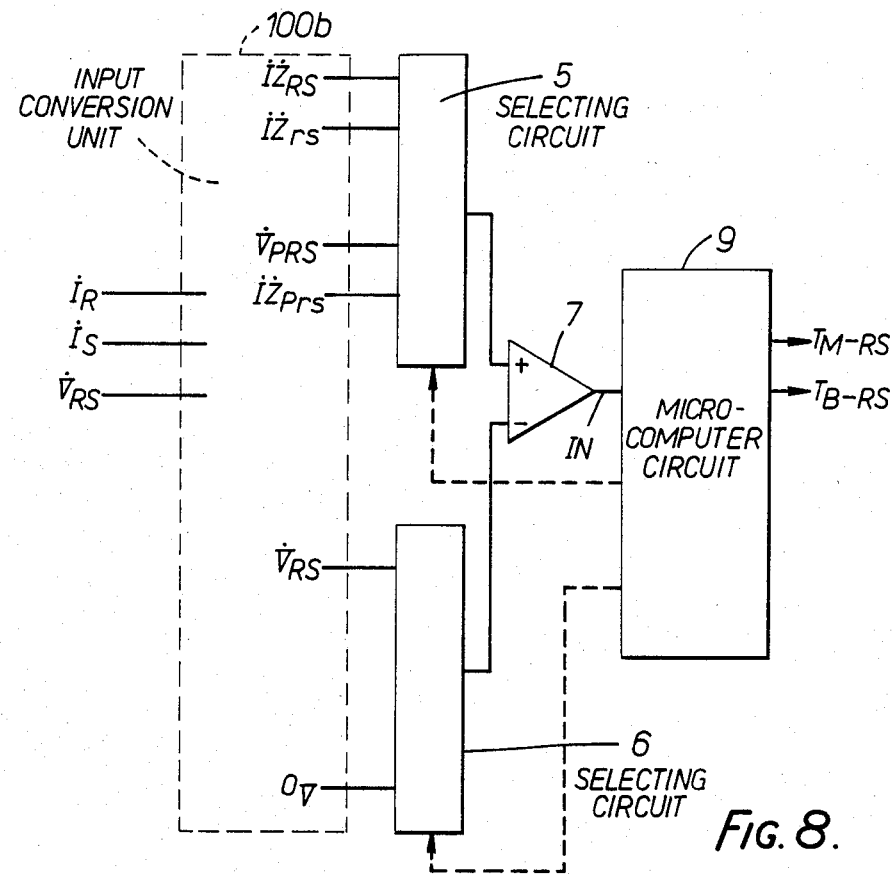
FIG. 8 is a block diagram illustrating a multi-component relay provided with ohm- and mho-characteristics as the other embodiment of the present invention.

Nextly, another embodiment according to the present invention will be described. FIG. 8 is a block diagram illustrating the other embodiment wherein the present invention is adapted to a so-called multi-component relay provided with the functions of mho- and ohm-characteristic components. In FIG. 8, the only part which differs from the structure of the protective relaying system shown in FIG. 4 is a microcomputer circuit 9 provided with such functions that differ from those of the microcomputer circuit 8. All other parts and electrical quantities with identical reference numerals and characters designate the identities in both the drawings.

Reference numeral 100b designates an input conversion unit which receives the currents $\dot{I}_R$ and $\dot{I}_S$, and the voltage $\dot{V}_{RS}$ and output electrical quantities $\dot{I}\dot{Z}_{RS}$, $\dot{I}\dot{Z}_{rs}$, $\dot{V}_{PRS}$, $\dot{I}\dot{Z}_{Prs}$ and $\dot{V}_{RS}$ and zero volts as a reference voltage. Here, the electrical quantities $\dot{I}\dot{Z}_{RS}$, $\dot{V}_{PRS}$ and $\dot{V}_{RS}$ are the same as those shown in FIG. 4 respectively. The electrical quantity $\dot{I}\dot{Z}_{rs}$ is an electrical quantity which is lags behind the electrical quantity $\dot{I}_{RS}$ by a predetermined electrical angle by a well-known phase shifter. The electrical quantity $\dot{I}\dot{Z}_{Prs}$ has the same phase as that of and has the amplitude proportional to that of the electrical quantity $\dot{I}\dot{Z}_{RS}$.

The input electrical quantities of the selecting circuit 5 are $\dot{I}\dot{Z}_{RS}$, $\dot{I}\dot{Z}_{rs}$, $\dot{V}_{PRS}$ and $\dot{I}\dot{Z}_{Prs}$. The electrical quantities of the selecting circuit 6 are the line voltages $\dot{V}_{RS}$ and zero volts. Reference characters $T_{M-RS}$ and $T_{B-RS}$ designate the outputs of the mho relay component and the ohm relay component, respectively.

Figure 9A:
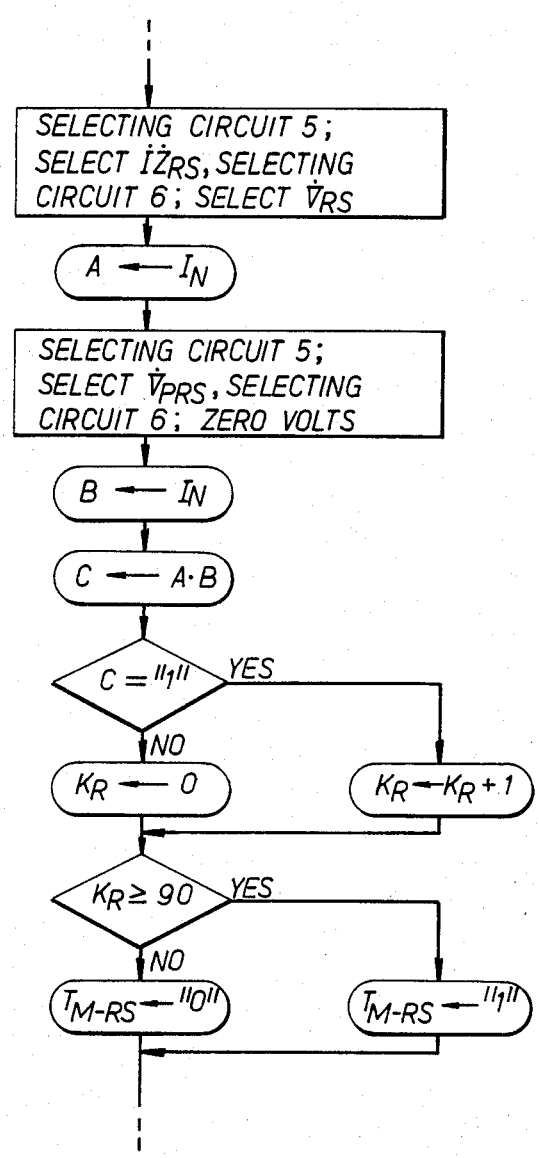
FIGS. 9(a) and 9(b) ar flowcharts illustrating operations of the microcomputer circuit shown in FIG. 8.
Figure 9B:
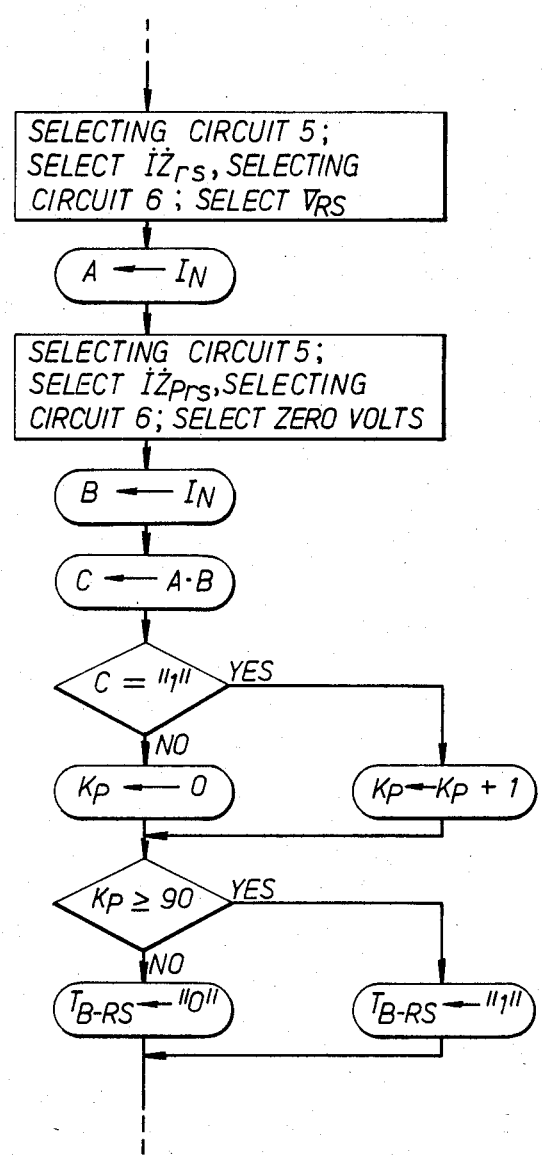

Nextly, the operations of this embodiment will be described. FIG. 9 shows an example of flowcharts of the microcomputer circuit 9. FIG. 9(a) shows a flowchart corresponding to the mho component, and FIG. 9(b), to the ohm component, respectively. The microcomputer circuit 9 cyclically repeats these procedures.

Now, the operations of the mho component in FIG. 9(a) are identical to those of STEP(S1) shown in FIG. 5, so that the description of its operations is omitted. In FIG. 9(b), the microcomputer circuit 9 causes the selecting circuit 5 to select the electrical quantity $\dot{I}\dot{Z}_{rs}$, and the selecting circuit 6, the electrical quantity $\dot{V}_{RS}$, respectively. As a result, the microcomputer circuit 9 receives a logical state "1" as the input signal $I_N$ when an instantaneous value of $(\dot{I}\dot{Z}_{rs}\text{-}\dot{V}_{RS})$ is positive, and when negative or zero, then receives a logical state "0". The input signal $I_N$ is transferred to a register A.

Next, the microcomputer circuit 9 causes the selecting circuit 5 to select the electrical quantity $\dot{I}\dot{Z}_{Prs}$, and the selecting circuit 6, zero volts, respectively. As a result, the microcomputer circuit 9 receives a logical state "1" as the input signal $I_N$ when the instantaneous value of $(\dot{I}\dot{Z}_{Prs})$ is positive, and when negative or zero, then receives a logican state "0". The input signal $I_N$ is transferred to a register B.

Figure 10:
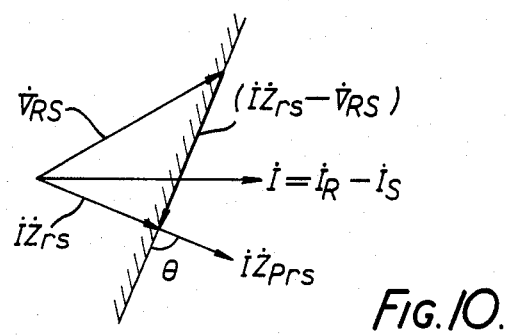
FIG. 10 is a characteristic diagram of the relay shown in FIG. 8.

Nextly, the logical product of the stored contents of the registers A and B is obtained, and the result such as a logical state "1" or "0" is transferred to a register C. Next, when the content of the register C is "1", that is, when both the instantaneous values of the electrical quantities $(\dot{I}\dot{Z}_{rs}\text{-}\dot{V}_{RS})$ and $\dot{I}\dot{Z}_{Prs}$ are positive, the procedure adds 1 to the count of the counter $K_p$. When the content of the register C is "0" the procedure causes the count of counter $K_P$ to be 0. Next, when the count of counter $K_P$ is greater than or equal to 90, the procedure causes the operation judging output $T_{B-RS}$ to be "1", and when less than 90, then causes the output $T_{B-RS}$ to be "0". Here, the number 90 is the number determined the same as aforementioned. Namely operations of ohm relay component are executed one time at every electrical angle of 1°, and when a phase angle between the electrical quantities $(\dot{I}\dot{Z}_{rs}\text{-}\dot{V}_{RS})$ and $\dot{I}\dot{Z}_{Prs}$ lies within 90°, the ohm component is caused to operate. The characteristics of ohm relay component are shown in vector presentation in FIG. 10.

As described above, according to the embodiment of the present invention, plural relay components having similarities in fundamental principle structure can be substituted by a single relay with the above described simplified structure, therefore, this effectively contributes to reduction in system scale for the protective relaying system.

In the aforementioned embodiments of the present invention, mho- and ohm relay components have been selectively described, however, distance relay components of various other characteristics, not limited to mho- and ohm characteristics, can also be realized by selecting diversely electrical quantities to be introduced to the inputs of the selecting circuits and contents of the programs stored within the microcomputer circuit.

Figure 11:
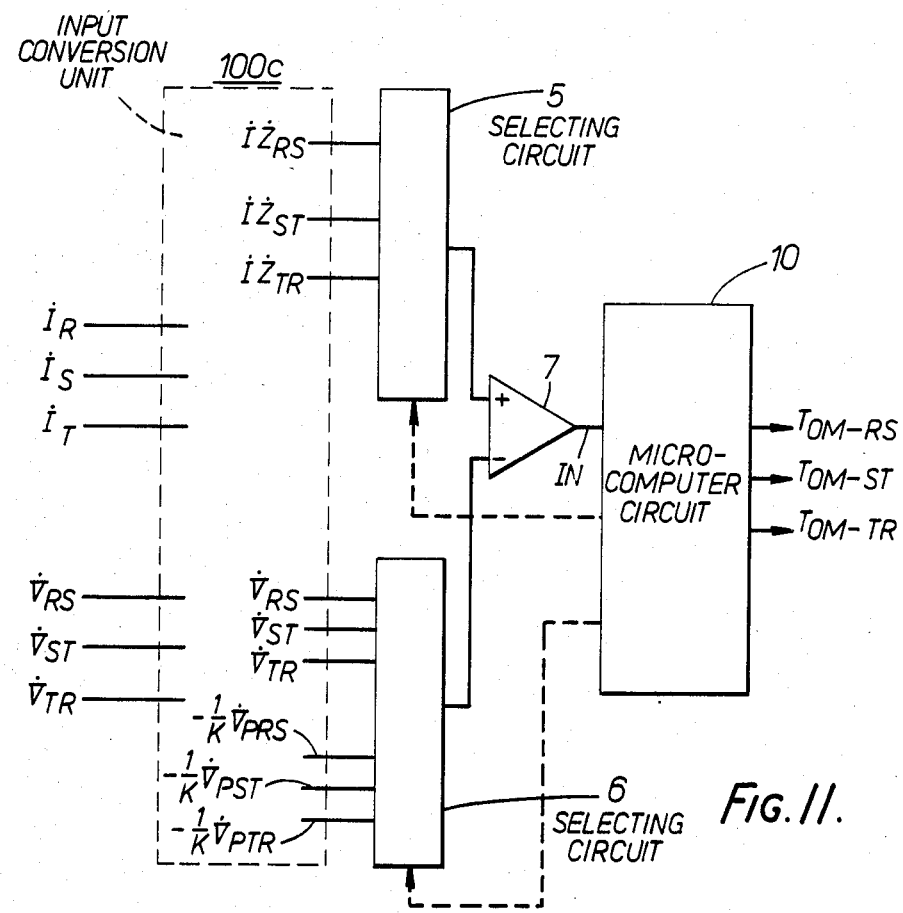
FIG. 11 is a block diagram illustrating an offset mho characteristic distance relay as another embodiment of the present invention.

Next, one example of such distance relay will be described. FIG. 11 shows a structural example of offset mho characteristic distance relay (hereinafter, simply called as offset mho relay) according to another embodiment of this invention. In FIG. 11, the differences from the structure shown in FIG. 4 are such that a microcomputer circuit 10 provided with stored programs which are partially different from those of the microcomputer circuit 8 is utilized, and that as an input electrical quantity to a selecting circuit 6, $-(1/K)\dot{V}_{PRS}$ is introduced. All other parts and electrical quantities with identical reference numerals and characters designate the identities in both the drawings.

Reference numeral 100c designates an input conversion unit which has the same structure as that of the input conversion unit 100a except that electrical quantities $(-1/k)\dot{V}_{PRS}$, $(-1/k)\dot{V}_{PST}$ and $(-1/k)\dot{V}_{PTR}$ are outputted instead of the electrical quantities $\dot{V}_{PRS}$, $\dot{V}_{PST}$ and $\dot{V}_{PTR}$, respectively. Here a coefficient multiplier which multiplies an input electrical quantity by a factor $(-1/k)$ is too well known to be shown in the input conversion unit 100a. The selecting circuit 5 receives the electrical quantities $\dot{I}\dot{Z}_{RS}$, $\dot{I}\dot{Z}_{ST}$ and $\dot{I}\dot{Z}_{TR}$. The selecting circuit 6 receives the electrical quantities $(-1/k)\dot{V}_{PRS}$, $(-1/k)\dot{V}_{PST}$ and $(-1/k)\dot{V}_{PTR}$. $T_{OM-RS}$, $T_{OM-ST}$ and $T_{OM-TR}$ are output signals of the relay.

Figure 12:
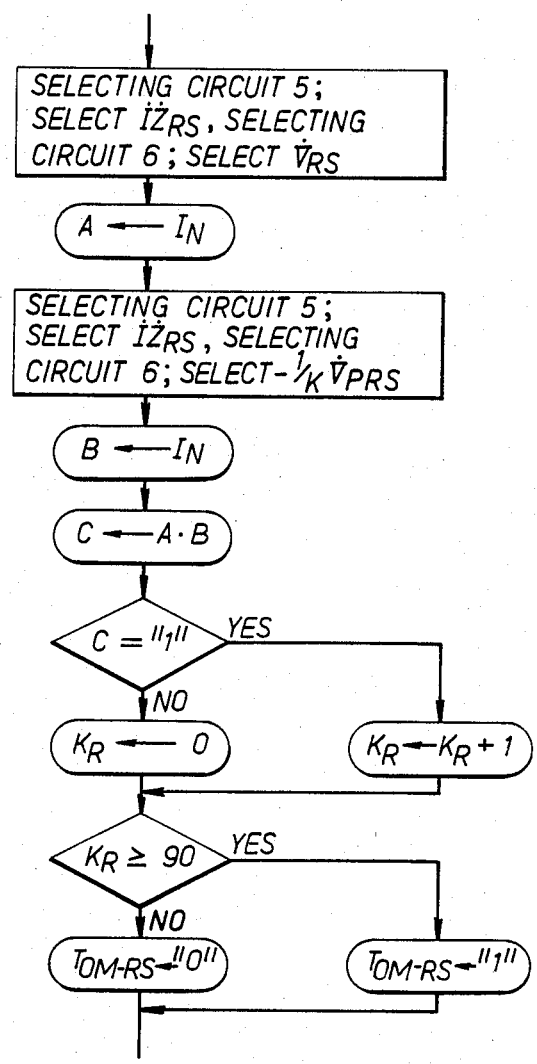
FIG. 12 is a flowchart illustrating operations of the microcomputer circuit shown in FIG. 11.

The operations of the above described embodiment will be explained with reference to FIG. 12, wherein an example of flowchart, relating only to the RS-phase, of the microcomputer circuit 10 is illustrated. First, the microcomputer circuit 10 causes the selecting circuit 5 to select the electrical quantity $\dot{I}\dot{Z}_{RS}$, and the selecting circuit 6, the electrical quantity $\dot{V}_{RS}$, respectively. As a result, the microcomputer circuit 10 receives a logical state "1" as the input signal $I_N$ when the instantaneous value of $(\dot{I}\dot{Z}_{RS}\text{-}\dot{V}_{RS})$ is positive, and when negative or zero, then receives a logical state "0". This input signal $I_N$ is transferred to a register A.

Next, the microcomputer circuit 10 causes the selecting circuit 5 to select the electrical quantity $\dot{I}\dot{Z}_{RS}$, the selecting circuit 6, the electrical quantity $(-1/K\,\dot{V}_{PRS})$, respectively. As a result, the microcomputer circuit 10 receives as the input signal $I_N$ a logical state "1" when the instantaneous value of $$\left(\dot{I}\dot{Z}_{RS} + \frac{1}{K}\dot{V}_{PRS}\right)$$

is positive, and when negative or zero, then receives a logical state "0". This input signal $I_N$ is transferred to a register B.

Nextly, a logical product of the stored contents of the registers A and B is processed, and the result is transferred to a register C. Next, when the content of the register C is "1", that is, when both the instantaneous values of the electrical quantities ($\dot{IZ}_{RS}-\dot{V}_{RS}$) and ($\dot{V}_{PRS}+K\dot{IZ}_{RS}$) are positive, the procedure adds 1 to the count of the counter $K_R$. When the stored content of the register C is "0", the procedure causes the count of counter $K_R$ to be 0.

Figure 13:
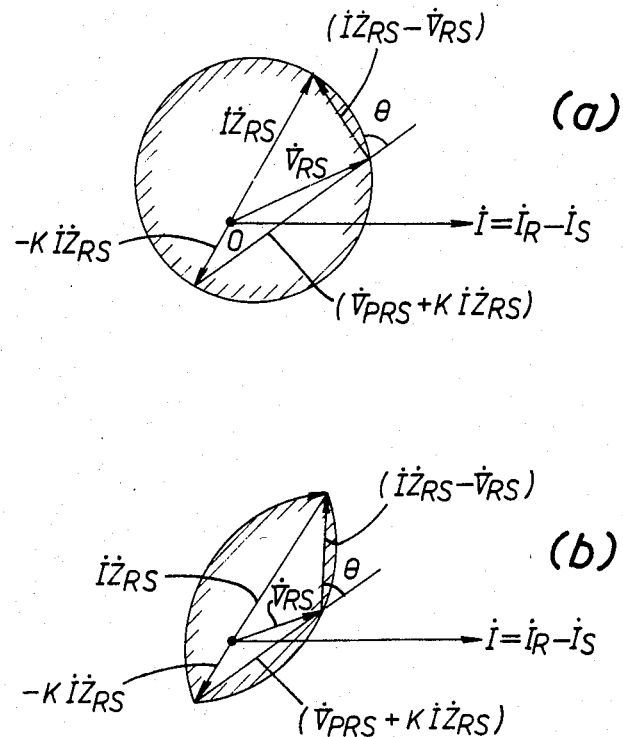
FIGS. 13(a) and 13(b) are characteristic diagrams of the relay shown in FIG. 11.

Next, when the count of the counter $K_R$ is greater than or equal to 90, the procedure causes the output $T_{M-RS}$ to be "1", and when less than 90, then causes the output $T_{M-RS}$ to be "0". Here, the number 90 is the number determined such that, as the same as described above, when operations of the offset-mho relay component are executed one time at an electrical angle of 1° and a phase angle between the electrical quantities ($\dot{IZ}_{RS}-\dot{V}_{RS}$) and ($\dot{V}_{PRS}+K\dot{IZ}_{RS}$) is less than 90°, the procedure causes the component to be operative. FIG. 13(a) shows a characteristic diagram of the offset-mho relay component shown in FIG. 11.

In the above described embodiment, when the count of the counter $K_R$ is greater than or equal to 135, the procedure causes the output $T_{OM-RS}$ to be "1", and when less than 135, then causes the output $T_{OM-RS}$ to be "0". This results in that when a phase angle between the electrical quantities ($\dot{IZ}_{RS}-\dot{V}_{RS}$) and ($\dot{V}_{PRS}+K\dot{IZ}_{RS}$), is less than or equal to 45°, the component becomes operative, so that a convex lens (a two-circular arc) characteristic is obtained, as shown in FIG. 13(b).

In the aforementioned embodiment shown in FIG. 11, only a structural example of an offset mho relay has been described, but also a reactance characteristic distance relay can readily be realized. Moreover, it is also possible to utilize the judging unit in common for a polyphase or multicomponent relay application.

Figure 14:
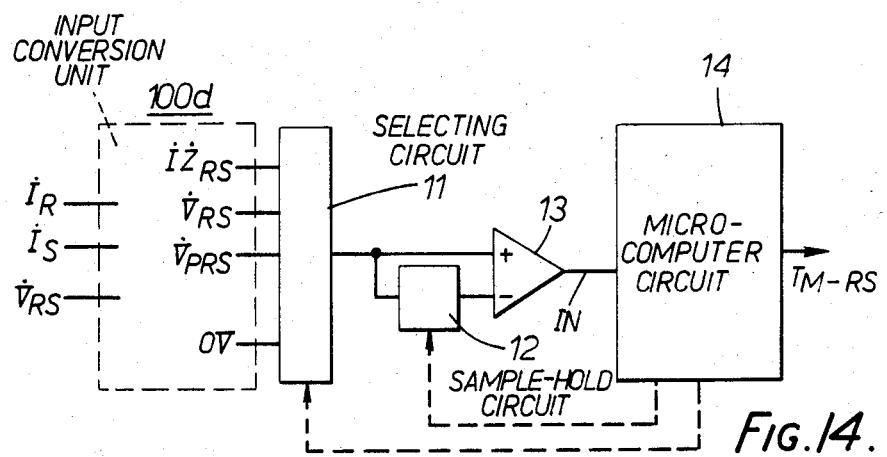
FIG. 14 is a block diagram illustrating another embodiment of the present invention.

In the embodiments of the present invention described above, the two selecting circuits have been utilized, however, this invention, as shown in FIG. 14, can reduce the number of selecting circuits by adopting a sample-hold circuit together with a single selecting circuit. FIG. 14 is a block diagram of the embodiment according to the present invention, wherein an RS-phase mho relay component is illustrated.

In FIG. 14, reference numeral 100d designates an input conversion unit which receives the current $\dot{I}_R$ and $\dot{I}_S$ and the voltage $\dot{V}_{RS}$ and outputs the electrical quantities $\dot{IZ}_{RS}$, $\dot{V}_{RS}$ and $\dot{V}_{PRS}$ and zero volts. A selecting circuit 11 is controlled, by selecting signals supplied from a microcomputer circuit 14, to select a single signal from plural input electrical quantities such as $\dot{IZ}_{RS}$, $\dot{V}_{RS}$, $\dot{V}_{PRS}$ and zero volts so as to output the same. A sample-hold circuit 12 is controlled by control signals supplied from the microcomputer circuit 14 so as to sample and hold an output of the selecting circuit 11. Reference numeral 13 designates a comparator constructed similarly to the comparator 7. A positive input terminal of the comparator 13 is connected to the output terminal of the selecting circuit 11 so as to receive the output electrical quantity thereof. On the other hand, a negative input terminal of the comparator 13 is connected to the output terminal of the sample-hold circuit 12 so as to receive the output electrical quantity thereof. The microcomputer circuit 14 is provided with such functions as follows: to control concurrently or separately the selecting circuit 11 and the sample-hold circuit 12, to receive and temporarily store a logical state signal outputted from the comparator 13 as the result of such controls, to process the temporarily stored signals in digital procedure, and to judge whether the relay is to be operated. Naturally, these procedures are executed in accordance with the programs stored within the microcomputer circuit 14. Reference character $T_{M-RS}$ designates the output of the relaying system.

Figure 15:
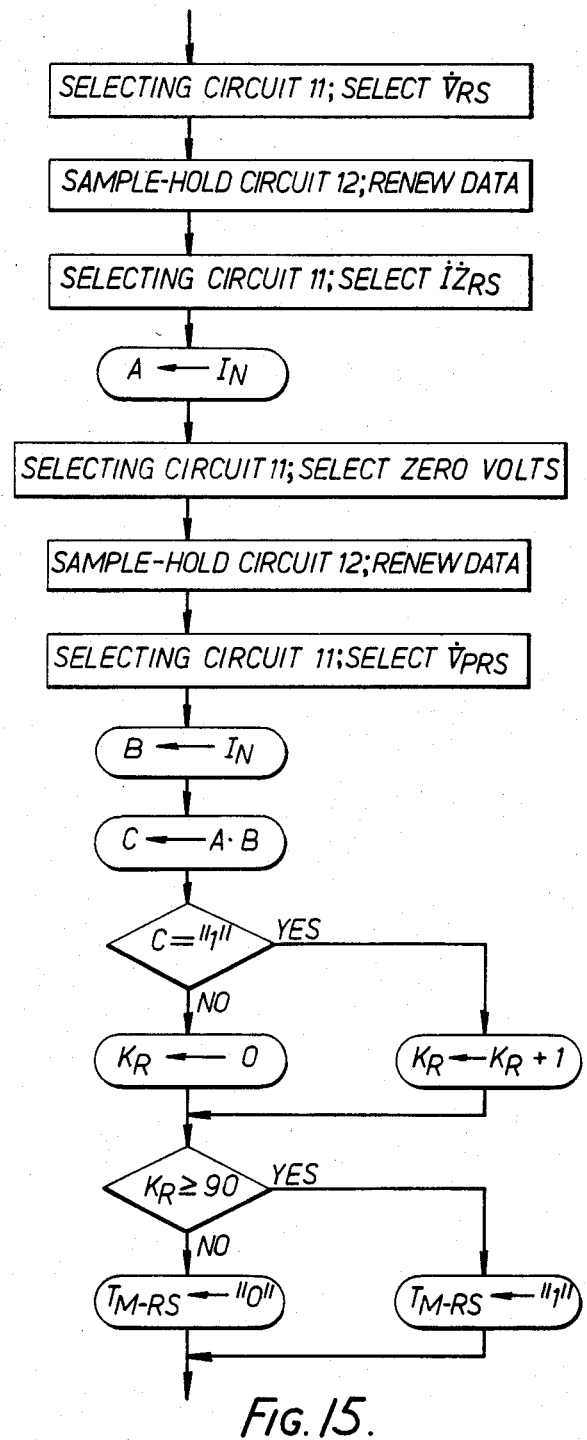
FIG. 15 is a flowchart illustrating operations of the microcomputer circuit shown in FIG. 14.

FIG. 15 is an example of flowcharts of the microcomputer circuit 14, whereby the operation thereof will be described. The microcomputer circuit 14 firstly causes the selecting circuit 11 to select the electrical quantity $\dot{V}_{RS}$. The selected electrical quantity $\dot{V}_{RS}$ is supplied to the positive input terminal of the comparator 13, while at the same time, also to the sample-hold circuit 12. Nextly, the microcomputer circuit 14 supplies the control signal to the sample-hold circuit 12 so as to sample and hold the electrical quantity $\dot{V}_{RS}$. The output of the sample-hold circuit 12 is supplied to the negative input terminal of the comparator 13. At this instant, the output signal of the comparator 13 is a logical state "0".

Next, the microcomputer circuit 14 causes the selecting circuit 11 to select the electrical quantity $\dot{IZ}_{RS}$. Under this condition, the output of comparator 13 becomes a logical state "1" when the instantaneous value of ($\dot{IZ}_{RS}-\dot{V}_{RS}$) is positive, and when negative or zero, then becomes a logical state "0". The microcomputer circuit 14 receives such logical state signals as the input signal $I_N$, and transfers the same to a register A.

Nextly, the microcomputer circuit 14 causes the selecting circuit 11 to select zero volts, and supplies the control signal to the sample-hold circuit 12 so as to sample and hold the selected zero volts, then causes the selecting circuit 11 to select the electrical quantity $\dot{V}_{PRS}$. As a result, the output of the comparator 13 becomes a logical state "1" when the instantaneous value of $\dot{V}_{PRS}$ is positive, and when negative or zero, then becomes a logical state "0". This is received by the microcomputer circuit 14 and transferred to a register B.

Next, a logical product of the stored contents of the registers A and B is processed, and the result is transferred to a register C. Next, when the stored content of register C is "1", that is, when both the instantaneous values of the electrical quantities ($\dot{IZ}_{RS}-\dot{V}_{RS}$) and $\dot{V}_{PRS}$ are positive, the procedure adds 1 to the count of the counter $K_R$. When the stored content of the register C is "0", the procedure causes the count of the counter $K_R$ to be 0.

Next, when the count of the counter $K_R$ is greater than or equal to 90, the procedure causes the output $T_{M-RS}$ to be "1", and when less than 90, then causes the output $T_{M-RS}$ to be "0". Here, the number 90 is the number determined such that, as aforementioned, when a phase angle between the electrical quantities ($\dot{IZ}_{RS}-\dot{V}_{RS}$) and $\dot{V}_{PRS}$ is equal to or less than 90°, the component becomes operative.

Figure 7:
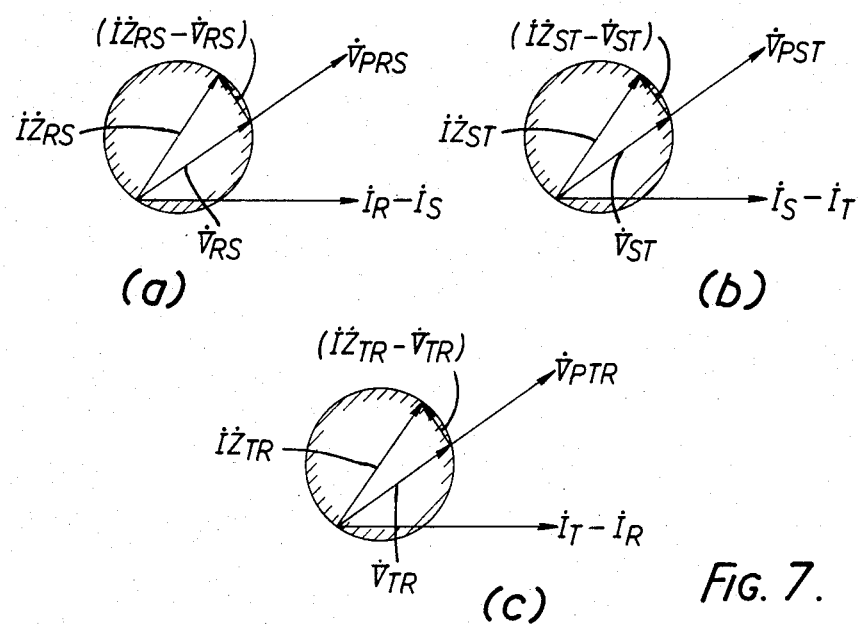
FIGS. 7(a) through 7(c) are characteristic diagrams of the relay shown in FIG. 4.

This characteristic becomes identical (though a single phase) to the mho characteristic shown in FIG. 7.

Even when such a single selecting circuit is utilized, it is obvious that the following characteristics can be realized by diversifying the electrical quantities to be inputted to the selecting circuit and the programs to preciously be stored within the microcomputer circuit 14:

(1) Various characteristics such as ohm-, reactance-, and offset mho-characteristics which can be obtained by varying diversely the input electrical quantities of the comparators 1 and 2 in the conventional example shown in FIG. 1;

(2) Characteristics of polyphase input-type relay same as the characteristics of the relay shown in FIG. 4; and (3) Characteristics of multi-component-type relay same as the characteristics of the relay shown in FIG. 8.

In the aforementioned embodiments, such structures wherein no analog operation processing are executed between the selecting circuits and the comparator have been described. However, the present invention is not limited to that, but it is also possible to provde analog computation circuits such as summation or subtraction circuits between the selecting circuits and the comparator.

Furthermore, in the aforementioned embodiments, such structures provided with a single comparator have been described, however, without any limitations to that, it is also possible to utilize plural comparators.

Figure 16:
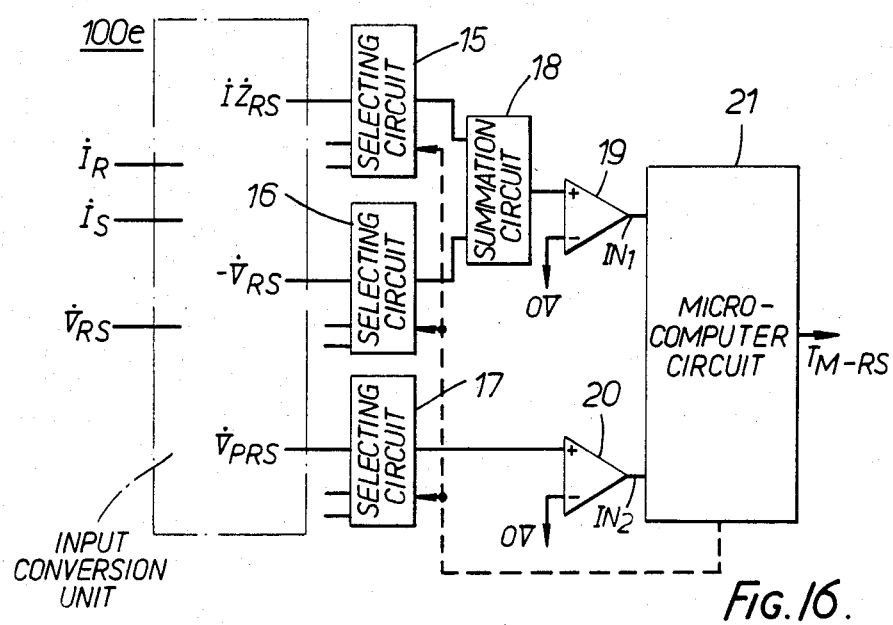
FIG. 16 is a block diagram illustrating another embodiment of the present invention.

FIG. 16 shows another embodiment of the present invention, wherein there is provided an input conversion unit $100e$ which receives the current $\dot{I}_R$ and $\dot{I}_S$ and the voltage $\dot{V}_{RS}$ and outputs the electrical quantities $\dot{I}\dot{Z}_{RS}$, $(-\dot{V}_{RS})$ and $\dot{V}_{PRS}$. The electrical quantity $(-\dot{V}_{RS})$ is the inverse of the electrical quantity $\dot{V}_{RS}$ which is easily obtained from the electrical quantity $\dot{V}_{RS}$, such as by inverting the polarity of the secondary winding of the transformer, so that an inverting circuit of the electrical quantity $\dot{V}_{RS}$ is not shown in the input conversion unit $100e$. Selecting circuits 15, 16 and 17 are constructed similarly to the selecting circuits 5 and 6, and have input electrical quantities $\dot{I}\dot{Z}_{RS}$, $(-\dot{V}_{RS})$ and $\dot{V}_{PRS}$, respectively. A summation circuit 18 receives the outputs of the selecting circuits 15 and 16, and sums the received signals so as to produce the summed output. Comparators 19 and 20 are constructed similarly to the comparator 7. The positive input terminal of the comparator 19 is connected to the output terminal of the summation circuit 18 so as to receive the output signal thereof. The negative input terminal of the comparator 19 receives zero volts. On the other hand, the positive input terminal of the comparator 20 is connected to the output terminal of the selecting circuit 17 so as to receive the output electrical quantity thereof. The negative input terminal of the comparator 20 receives zero volts. A microcomputer circuit 21 has such functions as follows: to control the selecting circuits 15, 16 and 17 on the basis of the respective predetermined sequence so as to supply predetermined electrical quantities to the respective input terminals of the comparators 19 and 20, to receive and temporarily store a logical state signal of the compared result from the comparators 19 and 20, and to process the temporarily stored signals in digital procedure so as to judge whether the relay is to be operated. Naturally, these procedures are executed in accordance with the programs stored within the microcomputer circuit 21.

Figure 17:
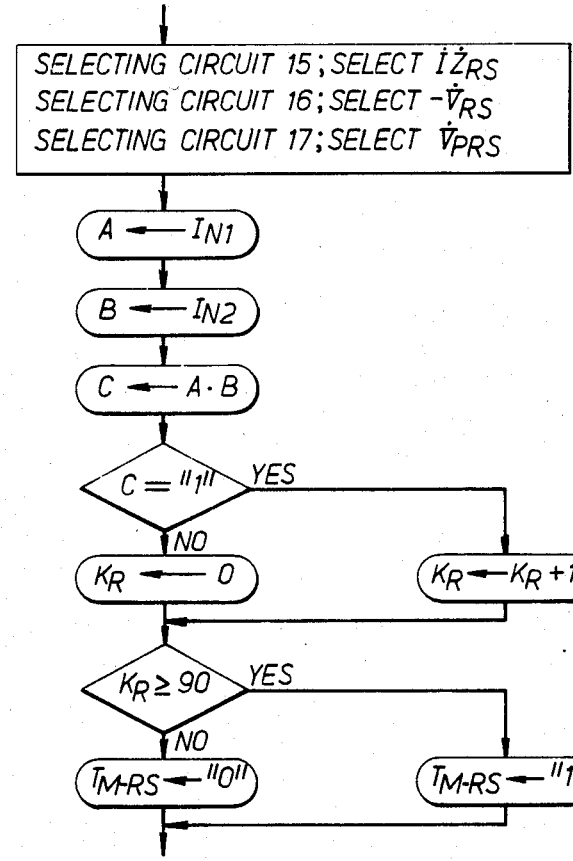
FIG. 17 is a flowchart illustrating operations of the microcomputer circuit shown in FIG. 16.

FIG. 17 shows an example of flowchart of the microcomputer circuit 21, which illustrates the operations thereof. First, the microcomputer circuit 21 causes the selecting circuits 15, 16 and 17, by applying concurrently selecting signals, to respectively select the electrical quantities $\dot{I}\dot{Z}_{RS}$, $(-\dot{V}_{RS})$, $\dot{V}_{PRS}$. As a result, the summing circuit 18 produces an output of electrical quantity $(\dot{I}Z - \dot{V}_{RS})$ which, in turn, is supplied to the positive input terminal of the comparator 19. When an instantaneous value of $(\dot{I}\dot{Z}_{RS} - \dot{V}_{RS})$ is positive, the comparator 19 outputs a logical state "1". Concurrently, the electrical quantity $\dot{V}_{PRS}$ is applied to the comparator 20, and when an instantaneous value of $\dot{V}_{PRS}$ is positive, the comparator 20 outputs a logical state "1".

Next, the microcomputer circuit 21 receives the outputs of the comparators 19 and 20 as the input signals $\dot{I}_{N1}$ and $\dot{I}_{N2}$, respectively, and transfers the signal $\dot{I}_{N1}$ to a register A, and the signal $\dot{I}_{N2}$, to a register B, respectively.

Next, a logical product of the stored contents of the registers A and B is processed, and the result is transferred to a register C. Next, when the stored content of the register C is "1", that is, when both the instantaneous values of electrical quantities $(\dot{I}\dot{Z}_{RS} - \dot{V}_{RS})$ and $\dot{V}_{PRS}$ are positive, the procedure adds 1 to the count of the counter $K_R$. When the stored content of the register C is "0", the procedure causes the count of the counter $K_R$ to be 0.

Nextly, when the count of the counter $K_R$ is greater than or equal to 90, the procedure causes the output $T_{M-RS}$ to be "1", and when less than 90, then causes the output $T_{M-RS}$ to be "0". Here, the number 90 is the number determined such that, as aforementioned, when a phase angle between the electrical quantities $(\dot{I}\dot{Z}_{RS} - \dot{V}_{RS})$ and $\dot{V}_{PRS}$ is equal to or less than 90°, the procedure causes the component to be operative.

This characteristic becomes identical (though for a single phase) to the mho-characteristics shown in FIG. 7.

Figure 18:
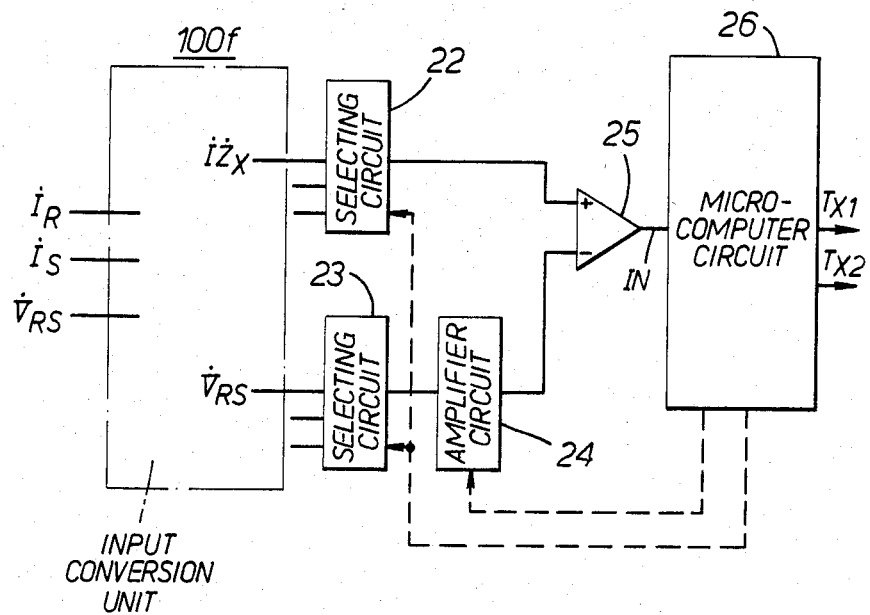
FIGS. 18(a) and 18(b) are block diagrams illustrating another embodiment of the present invention and the characteristic diagrams thereof.
Figure 18:
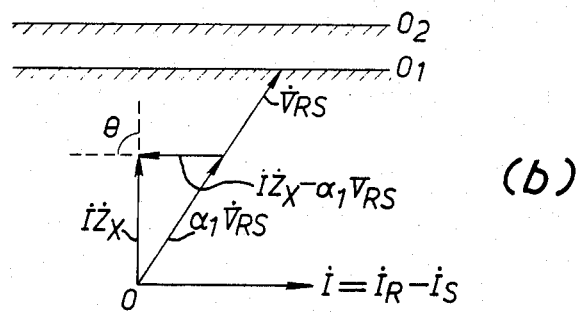

FIG. 18($a$) is a block diagram of another embodiment according to the present invention, wherein there is provided an amplifier circuit as a variable gain circuit between the selecting circuit and the comparator so as to obtain a first stage reactance characteristic $O_1$ and a second stage reactance characteristic $O_2$. In FIG. 18($a$), reference numeral $100f$ designates an input conversion unit which receives the current $\dot{I}_R$, $\dot{I}_S$ and the voltage $\dot{V}_{RS}$ and outputs electrical quantities $\dot{I}\dot{Z}_X$ and $\dot{V}_{RS}$. Here, the electrical quantity $\dot{I}\dot{Z}_X$ is an electrical quantity which leeds the electrical quantity $\dot{I}_{RS}(=\dot{I}_R - \dot{I}_S)$ by an electrical angle of 90° and is multiplied the electrical quantity $\dot{I}_{RS}$ by the magnitude of $|\dot{I}\dot{Z}_{X1}|$, and is easily obtained by shifting the electrical quantity $\dot{I}_{RS}$ in phase and multiplying by an impedance circuit, so that a converting circuit for the electrical quantity $\dot{I}\dot{Z}_X$ is not shown in the input conversion unit $100f$. Reference numerals 22 and 23 designate selecting circuits constructed similarly to the selecting circuits 5 and 6, with input electrical quantities $\dot{I}\dot{Z}_X$, ... and $\dot{V}_{RS}$ ... respectively. The selecting circuits 22 and 23 are controlled by a microcomputer circuit 26 to select a single signal from plural input electrical quantities such as $\dot{I}\dot{Z}_X$, ... $\dot{V}_{RS}$, ... and to output the same. In FIG. 18($a$), there are provided the selecting circuits 22 and 23 so as to cope with possible expansion to polyphase types, however, in case of application only to a single phase type, they may be omitted. An amplifier circuit 24 has an input terminal connected to the output terminal of the selecting circuit 23, and is constructed so that the gain thereof can be varied depending on a control signal supplied from the microcomputer circuit 26 (described later). A comparator 25 constructed similarly to the comparator 7 receives the output of the selecting circuit 22 at the positive input terminal thereof, and the output of the amplifier circuit 24 at the negative input terminal thereof, respectively. The microcomputer circuit 26 has such functions as to control the selecting circuits 22 and 23 and the amplifier circuit 24 so as to supply predetermined electrical quantities to the comparator 25, to receive and temporarily store the logical state signal outputted from the comparator 25 as the result of such control, to process the temporarily stored signals in digital procedure, and to judge whether the relay is to be operated. Naturally, these procedures are executed in accordance with the programs stored within the microcomputer circuit 26. The amplifier circuit 24 which is utilized as a variable gain circuit may be substituted by an attenuator circuit.

Figure 19:
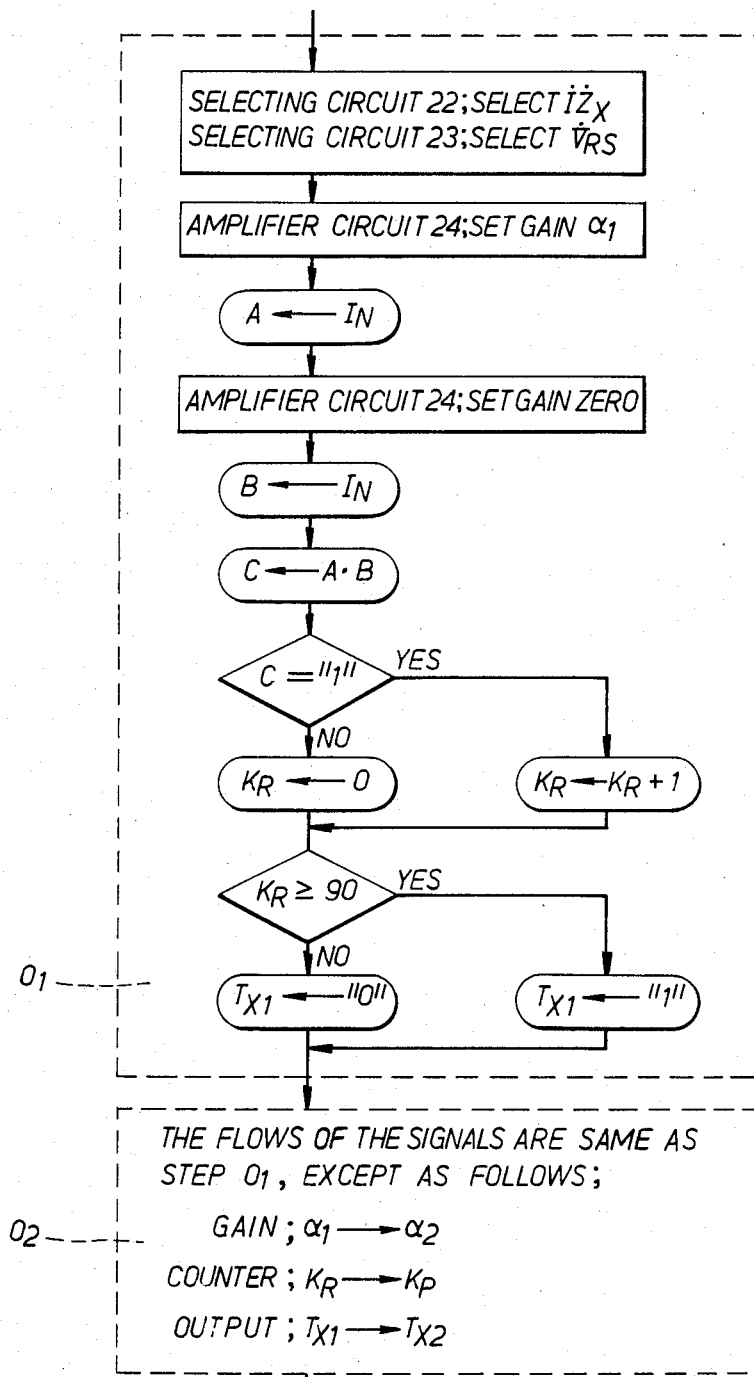
FIG. 19 is a flowchart illustrating operations of the microcomputer circuit shown in FIG. 18(a)

FIG. 19 shows an example of flowcharts of the microcomputer 26, with which the operations thereof will be described. In 01 STEP of FIG. 19, the microcomputer circuit 26 firstly causes, by supplying the selecting signals, the selecting circuits 22 and 23 to select electrical quantities $\dot{IZ}_X$ and $\dot{V}_{RS}$, respectively.

Next, the microcomputer circuit 26 causes, by supplying the control signal, the amplifier circuit 24 to set the gain thereof to $\alpha_1$. As a result, when an instantaneous value of $(\dot{IZ}_X - \alpha_1 \dot{V}_{RS})$ is positive, the output of the comparator 25 becomes "1". The microcomputer circuit 26 receives this signal as an input signal $I_N$, and the signal is transferred to a register A.

Next, the microcomputer circuit 26 causes the amplifier circuit 24 to set the gain thereof to zero. As a result, when an instantaneous value of $\dot{IZ}_X$ is positive, the output of the comparator 25 becomes "1". The microcomputer 26 receives this signal as the input signal $I_N$, and the signal is transferred to a register B.

Next, a logical product of the stored contents of the registers A and B is processed, and the result is transferred to a register C. Next, when the content of the register C is "1", that is, when both the instantaneous values of $(\dot{IZ}_X - \dot{V}_{RS})$ and $\dot{IZ}_X$ are positive, the procedure adds 1 to the count of the counter $K_R$. When the stored content of the register C is "0", the procedure causes the count of the counter $K_R$ to be 0.

Nextly, when the count of the counter $K_R$ is greater than or equal to 90, the procedure causes the output $T_{X1}$ to be "1", when less than 90, then causes the output $T_{X1}$ to be "0". Here, the number 90 is the number determined such that, as aforementioned, when a phase angle between the electrical quantities $(\dot{IZ}_X - \dot{V}_{RS})$ and $\dot{IZ}_X$ is within 90°, the procedure cause the component to be operative. The characteristic under this condition becomes the $O_1$ characteristic shown in FIG. 18(b).

Next, in 02 STEP of FIG. 19, in order to prevent interference with 01 STEP, there are provided a register $K_P$ in place of $K_R$, and an output $T_{X2}$ in place of $T_{X1}$. Further, the gain $\alpha_1$ is substituted by the gain $\alpha_2$, and this causes the characteristic to be $O_2$ characteristic shown in FIG. 18(b).

As described above, in this embodiment, by controlling the gain of the amplifier a plurality of characteristics can be obtained, further, by causing the amplifier to set the gain thereof to zero, the procedure can cause the amplifier to operate as a selecting circuit.

Moreover, it is also obvious that this embodiment is not limited to a reactance-type distance relay component, but it is also applicable to an ohm relay component.

Figure 20:
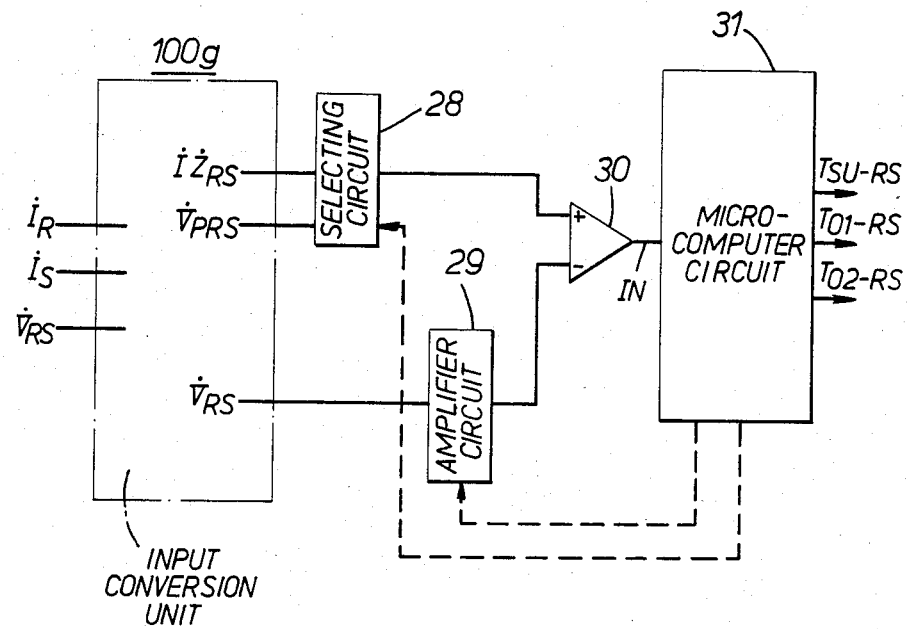
FIG. 20 is a block diagram illustrating another embodiment of the present invention.

In aforementioned embodiments, the microcomputer circuits are designed to execute digital processing by utilizing only the signals received nearly concurrently. This invention is not limited to this, but it is also possible to execute digital processing by utilizing, together with the present input signal, the previously stored signals within storage areas, in which the input signals received previously during such a period that corresponds to a predetermined electrical angle prior to the present input signal have been stored. FIG. 20 shows another embodiment of the present invention. Numeral 100g designates an input conversion unit having the same structure as that of the input conversion unit 100d shown in FIG. 14 except that the input conversion unit 100g does not output zero volts. A selecting circuit 28 which is constructed similarly to the selecting circuit 5 receives electrical quantities $\dot{IZ}_{RS}$ and $\dot{V}_{PRS}$ from the input conversion unit 100g. The selecting circuit 100g is controlled by a control signal supplied from a microcomputer circuit 31 so as to select a single signal from plural input signals thereof, and to output the same. An amplifier circuit 29 is constructed similarly to the amplifier circuit 24, is connected to receive the electrical quantity $\dot{V}_{RS}$ and is controlled by a control signal supplied from the microcomputer circuit 31 so as to vary the gain thereof. A comparator 30 constructed similarly to the comparator 7 receives the output of the selecting circuit 28 at the positive input terminal and the output of the amplifier circuit 29, at the negative input terminal, respectively. The comparator 30 judges which one of two input electrical quantities is greater than the other, and then outputs a logical state signal. The microcomputer circuit 31 has such functions as to control the selecting circuit 28 and the amplifier circuit 29 so as to supply predetermined electrical quantities to the comparator 30, to receive and temporarily store a logical state output of the comparator 30 created as a result of such controls, to process the temporarily stored signals in digital procedure, and to judge whether the relay is to be operated.

Natrually, these procedures are executed in accordance with the programs stored within the microcomputer circuit 31.

In FIG. 20, reference characters $T_{SU-RS}$, $T_{O1-RS}$ and $T_{O2-RS}$ represent relay-operation judging outputs of mho relay component, a first stage reactance relay component and a second stage reactance relay component, respectively.

Figure 21A:
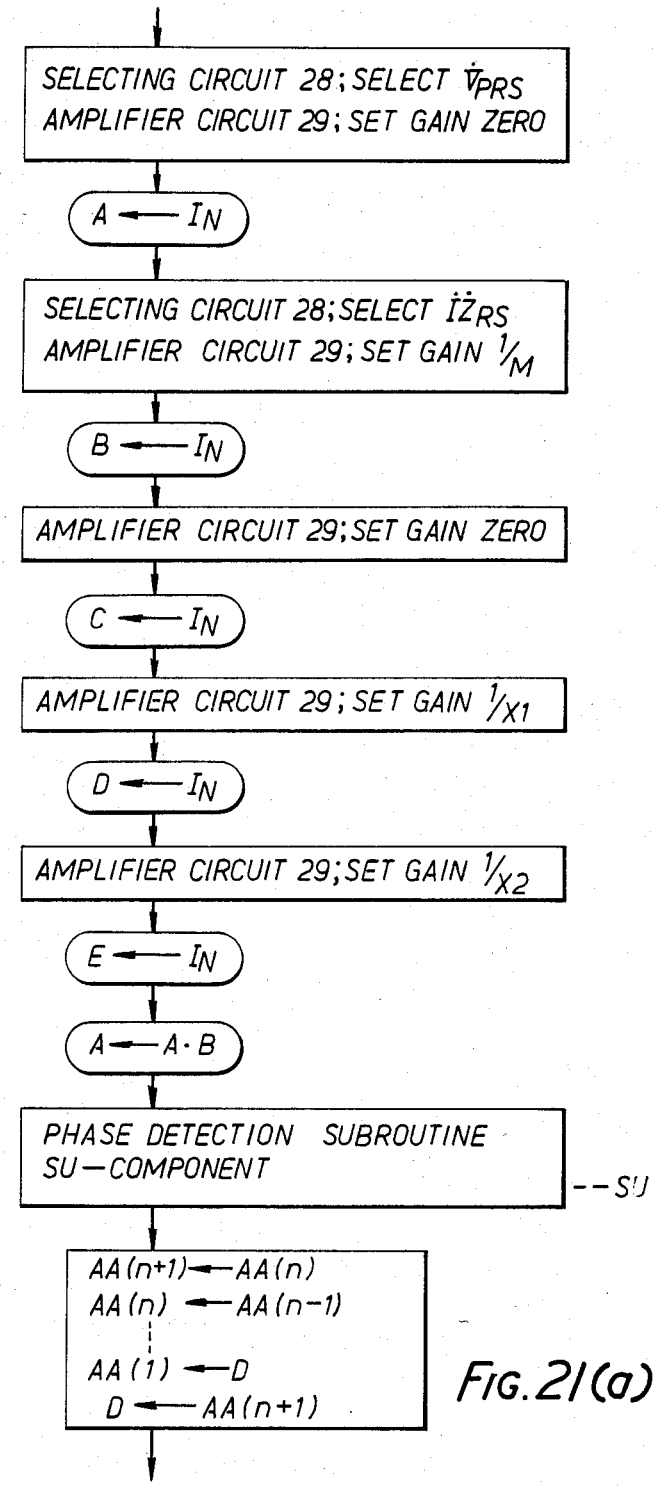
FIGS. 21(a) and 21(b) are flowcharts of operations of the microcomputer circuit shown in FIG. 20.
Figure 21B:
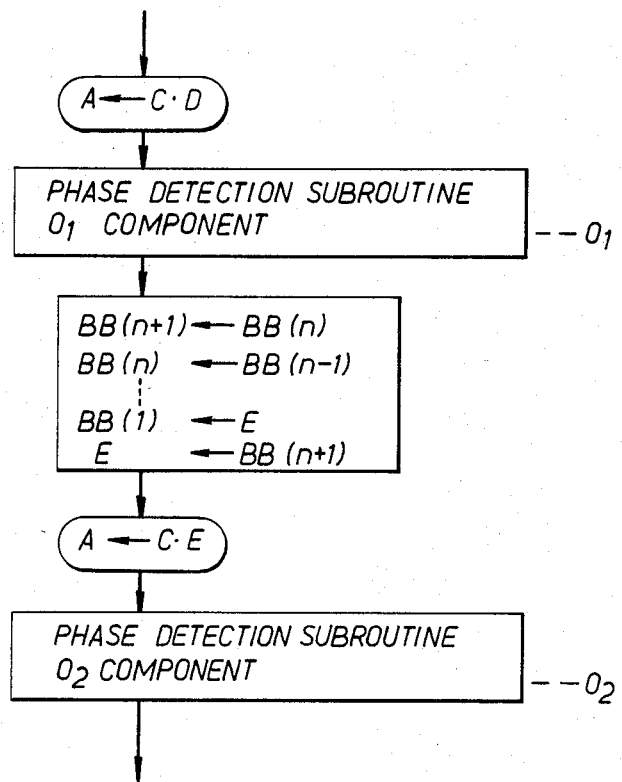

FIG. 21(a) and 21(b) are an example of flowcharts of the microcomputer circuit 31. First the microcomputer circuit 31 causes, by supplying selecting signals, the selecting circuit 28 to select the electrical quantity $\dot{V}_{PRS}$, and concurrently causes, by supplying the control signal, the amplifier circuit 29 to set the gain thereof to zero. Under this condition, when an instantaneous value of $\dot{V}_{PRS}$ is positive, the comparator 30 outputs a logical state "1", when negative or zero, the outputs "0". The logical state signal is received by the microcomputer circuit 31 as the input signal $I_N$ and transferred to a register A.

Next, the microcomputer circuit 31 causes the selecting circuit 28 to select the electrical quantity $\dot{IZ}_{RS}$ by supplying selecting signals, and causes the amplifier circuit 29 to set the gain thereof to 1/M by supplying control signal. Under this condition, when an instantaneous value of $(\dot{IZ}_{RS} - \dot{V}_{RS}/M)$ is positive, the output of the comparator 30 becomes "1", and when negative or zero, then becomes "0". This signal is received by the microcomputer circuit 31 as the input signal $I_N$, and transferred to a register B.

Next, the microcomputer circuit 31 causes, by supplying control signal the amplifier circuit 29 to set the gain thereof to zero. Under this condition, when an instantaneous value of $\dot{IZ}_{RS}$ is positive, the output of the comparator 30 becomes "1", and when zero or negative, then becomes "0". This signal is received by the microcomputer circuit 31 as the input signal $I_N$, and transferred to a register C.

Nextly, the microcomputer circuit 31 causes, by supplying control signal the amplifier circuit 29 to set the gain thereof to $1/X_1$. Under this condition, when an instantaneous value of $(\dot{I}\dot{Z}_{RS}-\dot{V}_{RS}/X_1)$ is positive, the output of the comparator 30 becomes "1", and when negative or zero, then becomes "0". This signal is received by the microcomputer circuit 31 as the input signal $I_N$, then transferred to a register D.

Next, the microcomputer circuit 31 causes, by supplying control signals, the amplifier circuit 29 to set the gain thereof to $1/X_2$. Under this condition, when an instantaneous value of $(\dot{I}\dot{Z}_{RS}-\dot{V}_{RS}/X_2)$ is positive, the output of the comparator 30 becomes "1", and when negative or zero, then becomes "0". This signal is received by the microcomputer circuit 31 as the input signal $I_N$, then transferred to a register E.

Nextly, a logical product of the stored contents of the registers A and B is processed, and the result is transferred to the register A. The content of the register A becomes "1" when both an instantaneous values of the electrical quantities $\dot{V}_{PRS}$ and $(\dot{I}\dot{Z}_{RS}-\dot{V}_{RS}/M)$ are positive, so that the procedure causes the output Tsu to be "1" when the phase angle between both the electrical quantities is less than 90° by the phase detection subroutine shown in FIG. 5. Nextly, the microcomputer unit 31 provides a storage area AA of (n+1) bits and controls it in the same manner as a shift register so as to store the previous state of the register D, which is n bits prior to the present state thereof within the register D. In this embodiment, the number n is defined as the number corresponding to an electrical angle of 90°-(the line impedance angle).

Next, a logical product of the stored content of the registers C and D is processed, and the result is transferred to the register A. This logical product stored in the register A becomes "1" when the instantaneous value of the electrical quantity $\dot{I}\dot{Z}_{RS}$ and the previous instantaneous value of the electrical quantity $(\dot{I}\dot{Z}_{RS}-\dot{V}_{RS}/X_1)$ which is prior to the present value thereof by an electrical angle of 90°-(the line impedance angle) are both positive, so that the procedure causes the output $T_{01-RS}$ to be "1" when the phase angle between both the electrical quantities are within 90° by the phase detection subroutine in the aforementioned manner.

Nextly, the microcomputer unit 31 also provides a storage area BB of (n+1) bits and controls it in the same manner as a shift register so as to store the previous state of the register E, which is n bits prior to the present state thereof, within the register E.

Next, a logical product of the stored contents of the registers C and E is processed, and the result is transferred to the register A. The logical product stored in the register A becomes "1" when the instantaneous value of the electrical quantity $\dot{I}\dot{Z}_{RS}$ and the previous instantaneous value of the electical quantity $(\dot{I}\dot{Z}_{RS}-\dot{V}_{RS}/X_2)$ which is prior to the present value thereof by an electical angle of (90°-(the line impedance angle)) are both positive, so that the procedure causes the output $T_{02-RS}$ to be "1" when the phase angle between both the electrical quantities are within 90° by the phase detection subroutine in the aforementioned manner.

Figure 22:
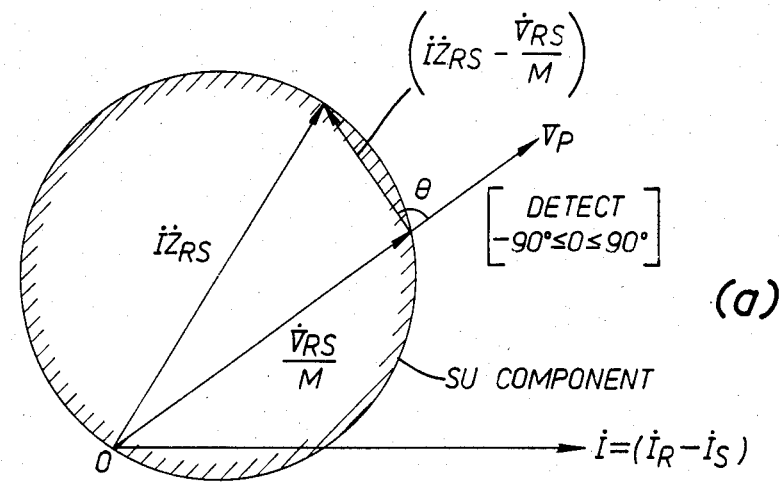
FIGS. 22(a) and 22(b) are vector diagrams of mho- and reactance-characteristics of the relay shown in FIG. 20.
Figure 22:
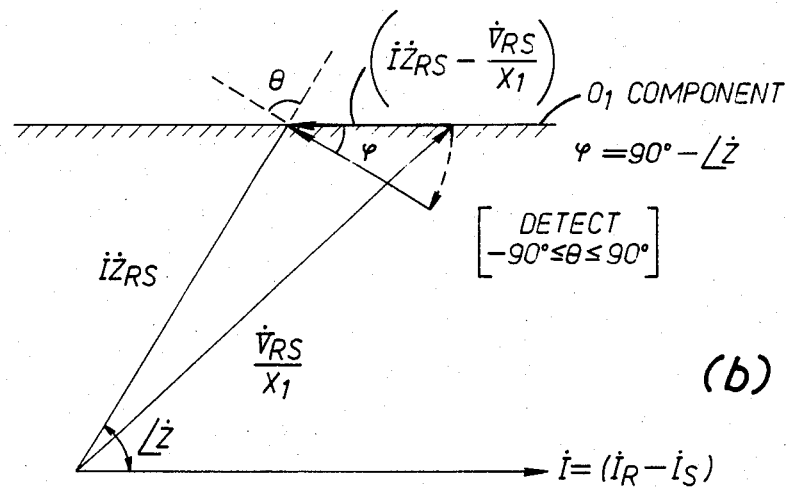

FIG. 22(a) shows a vector diagram of SU component (mho characteristics) of this embodiment, and FIG. 22(b) shows a vector diagram of $O_1$ component (reactance characteristics). The $O_2$ component is identical to the $O_1$ component except the setting thereof, so that description thereof is omitted.

Here, this reactance characteristic can be realized by holding the angle, which is defined by the electrical quantity which lags behind the electrical quantity $(\dot{I}\dot{Z}_{RS}-\dot{V}_{RS}/X_1)$ by an electrical angle of $\psi$ and the electrical quantity $\dot{I}\dot{Z}_{RS}$, within an electrical angle of 90°. However, as described above, the register D has a logical state corresponding to the previous instantaneous value of the electrical quantity $(\dot{I}\dot{Z}_{RS}-\dot{V}_{RS}/X_1)$ which is n times prior to the present value thereof, that is, prior thereto by an electrical angle of $\psi(=90°-$ the line impedance angle). On the other hand the register C has a logical state corresponding to the present instantaneous value of the electrical quantity $\dot{I}\dot{Z}_{RS}$. Therefore, by checking that the AND condition of the register C and D holds for the period corresponding to an electrical angle of 90° or more, this reactance characteristic can be realized. In the conventional system, there should be provided, for mho characteristics, an electrical quantity indicative of a current which leads the current $(\dot{I}=\dot{I}_R-\dot{I}_S)$ by a line impedance angle, and for reactance characteristics, an electrical quantity indicative of a current which leads the current $(\dot{I}=\dot{I}_R-\dot{I}_S)$ by 90°, respectively. This embodiment, however, can obtain both characteristics, with only the former current, so that the distance relay with more simplified structure can be realized.

In the aforementioned embodiments, a combination of two electrical quantities to be judged in terms of the phase relationship there between (such as $\dot{V}_{PRS}$ and $(\dot{I}\dot{Z}_{RS}-\dot{V}/M)$, and $\dot{I}\dot{Z}$ and $\dot{V}_{RS}/X_1$) have been utilized to detect whether the phase difference there between lies within a predetermined region. Here, such two electrical quantities are selected from the input electrical quantities (such as $\dot{V}_{RS}$ and $\dot{I}\dot{Z}_{RS}$) by means of the selecting circuits (such as reference numerals 5 and 6 in FIG. 4) and also from the synthesized electrical quantities of the input electrical quantities (such as $(\dot{I}\dot{Z}_{RS}-\dot{V}_{RS})$, $(\dot{I}\dot{Z}_{RS}-\dot{V}_{RS}/M)$ and $(\dot{I}\dot{Z}_{RS}-\dot{V}_{RS}/X_1)$). Such detection has been made in such manners as follows.

Namely, the procedure selects the instantaneous values of such two electrical quantities so as to supply to the comparators (such as reference numerals 7, 13, 19, 20, 25 and 30). In terms of the synthesized electrical quantity such as $(\dot{I}\dot{Z}-\dot{V}_{RS})$, there are provided two possible cases in supplying to the comparator. One case is that the synthesized electrical quantity $(\dot{I}\dot{Z}-\dot{V}_{RS})$ is supplied to one of the two input terminals of the comparator. The other case is that the respective electrical quantities $\dot{I}\dot{Z}_{RS}$ and $\dot{V}_{RS}$ which constitute the synthesized electrical quantity are respectively supplied to separately different input terminals (i.e. positive and negative input terminals). When the respective instantaneous values of the two electrical quantities supplied to the comparator are positive, the comparator produces the output signal of logical state "1" corresponding to the respective instantaneous values. Next, the procedure detects such phase relationship by checking that the output signal of the comparator (or delayed signal such as in the embodiment shown in FIG. 21) maintains continuously the logical state "1" for a certain specified number of times (e.g. the number of times corresponding to an electrical angle of 90°). However, the detection manner according to the present invention is not limited to that described above. A variety of the modified detection manners of phase relationship can also be realized, the modifications thereof will be described hereinafter.

For example, in the flowchart shown in FIG. 5, the step (C←A·B, a logical product of the stored contents of the registers A and B is transferred to the register C) may be substituted by the step (C←$\overline{A}$·$\overline{B}$, a logical product of the inverse of the stored contents of the registers A and B is transferred to the register C), or the step (C←A·B+$\overline{A}$·$\overline{B}$, a logical sum of A·B and $\overline{A}$·$\overline{B}$ is transferred to the register C) so as to detect the identical phase relationship. The respective manners described above are to detect that the coincidence of the output signals of the comparators corresponding to the respective electrical quantities (or signals delayed from the output signals) has occurred successively for a certain specified number of times.

Futhermore, it is obvious that the identical phase relationship may be detected by utilizing such manners as follows: in the embodiment shown in FIG. 4, for example, the electical quantity $V_{PRS}$ may be substituted by the inverted electrical quantity, $(-V_{PRS})$; in the flowchart in FIG. 5, the step (C←A·B) may be substituted by the step (C←A·$\overline{B}$, a logical product of the stored content of the register A and the inverse of the stored content of the register B is transferred to the register C), or by the step (C←$\overline{A}$·B, a logical product of the inverse of the stored content of the register A and the stored content of the register B is transferred to the register C), or by the step (C←A·$\overline{B}$+$\overline{A}$·B, a logical sum of A·$\overline{B}$ and $\overline{A}$·B is transferred to the register C).

The respective manners described above are to detect that the noncoincidence of the output signals of the comparators corresponding to the respective electical quantities (or signals delayed from the output signals) has occurred successively for a certain specified number of times.

The manners to detect the phase relationship are not limited to the above described manners in which the procedure detects whether or not either coincidence or noncoincidence of logical states of two signals continues for a certain specified number of times. Namely, when coincidence of such logical states continues for more than the specified number of times (for example, more than the number corresponding to an electrical angle of 90°), naturally noncoincidence of such logical states continues for less than the specified number of times (for example, less than the number corresponding to an electrical angle of 90°), so that, by detecting this, the similar phase relationship can be detected.

Figure 23:
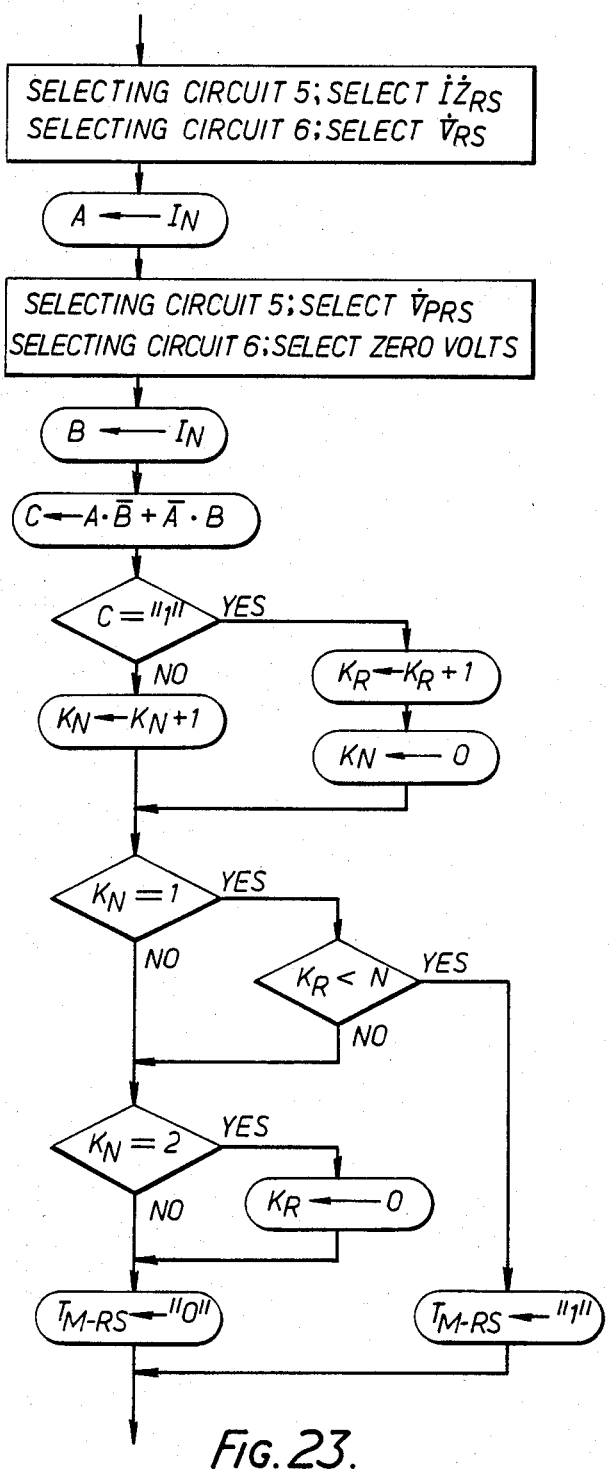
FIG. 23 through FIG. 25 are flowcharts respectively illustrating operations of the microcomputer circuits of the other embodiments of the present invention.

FIG. 23 shows a flowchart on R-S phase according to another embodiment wherein such detection manners described above are utilized in the embodiment shown in FIG. 4, and the characteristics similar to STEP S1 in FIG. 5 can be obtained. In FIG. 23, the flow up to the step (B←$I_N$) is similar to that in FIG. 5. A logic transfer to the register C employs the above described step (C←A·$\overline{B}$+$\overline{A}$·B), and when the logical states do not coincide, the stored content of the register C becomes "1". When the stored content of the register C is "1", the procedure adds 1 to the count of the counter $K_R$, and causes the count of a counter $K_N$ to be 0. When the stored content of the register C is "0" the procedure adds 1 to the count of the counter $K_N$. When the count of the counter $K_N$ is 1, and if the count of the counter $K_R$ is smaller than the specified number N, the procedure causes the output $T_{M-RS}$ to be "1". Except for this condition, the output $T_{M-RS}$ is held "0". When the count of the counter $K_N$ is 2, the procedure causes the count of the counter $K_R$ to be 0.

The above described manner to detect whether or not either coincidence or noncoincidence of the logical states continues for more than the specified number of times also includes the case in which even when such coincidence or noncoincidence does not continue in complete succession, if it can be regarded as substantial continuity, then the procedure detects it assuming that it would continue for more than the specified number of times. This can be realized by adopting a counter which counts the case when the condition C="1" does not hold, for example, in the flowchart shown in FIG. 5, and when the count thereof beomes 2, the count of the counter $K_R$ is reset to 0. Further, in FIG. 23, the procedure replaces the conditions ($K_N$=1) and ($K_N$=2) by the conditions ($K_N$=2) and ($K_N$=3), respectively, and only after the case when the condition (C="1") does not hold has occurred twice, judges whether or not the number of successions of the condition (C="1") is less than the specified number N, and if such case occurs three times, then the procedure causes the counters $K_R$ to be reset to 0. These manners are effective to prevent the relay from being erroneously inoperative or erroneously operative when the comparators are in danger of producing abnormal outputs due to noises or disturbances.

Figure 24:
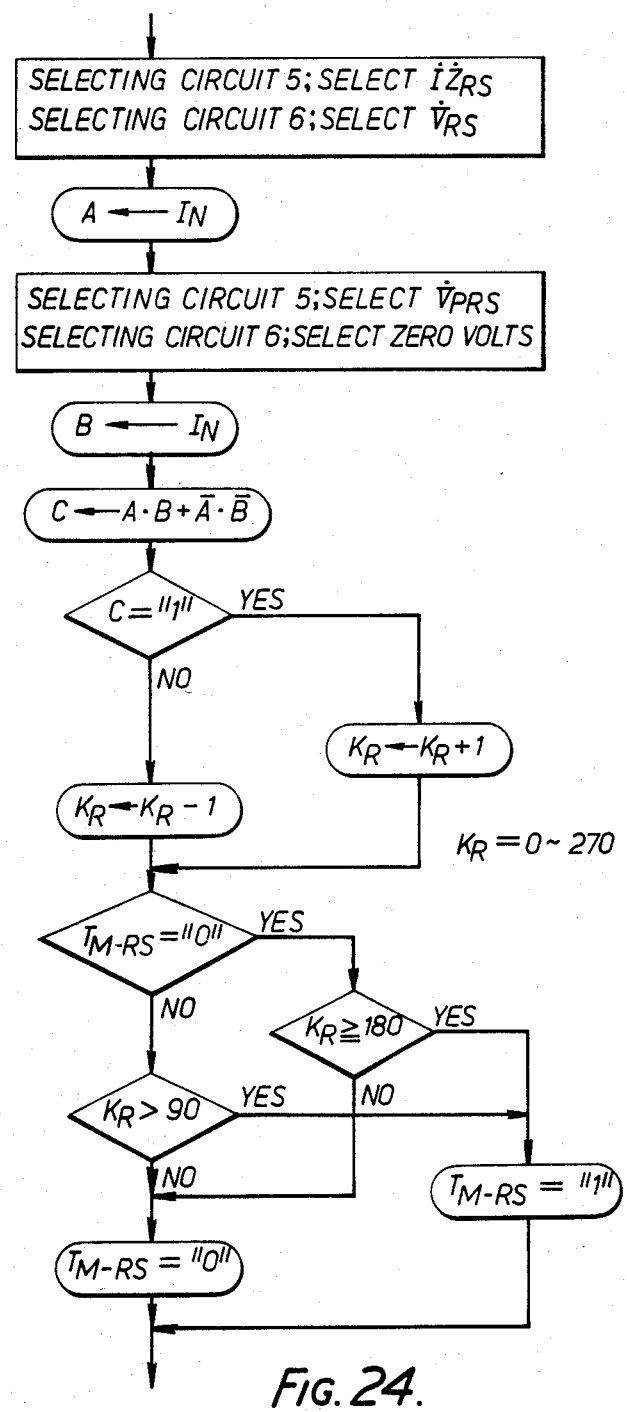

FIG. 24 shows a flowchart indicative of another embodiment according to the present invention, which may be used in place of STEP S1 in FIG. 5, and where the phase characteristics similar thereto can be obtained. This embodiment shows the case when logical procedures are executed at a rate of one time at every electrical angle of 1° of the input electrical quantities. In FIG. 24, the flow up to the step (B←$I_N$) is similar to that in FIG. 5. A logic transfer to the register C is made as in the above described manner that is, C←A·B+$\overline{A}$·$\overline{B}$, and when the logical states of the registers A and B coincide with each other, either case of "1" or "0", the content of the register C becomes "1". When C=1 the procedure adds 1 to the count of the counter $K_R$, and when C=0, the procedure subtracts 1 from the count of the counter $K_R$. When the relay is inoperative, that is, when the output $T_{M-RS}$ is "0", and if the count of the counter $K_R$ is greater than or equal to 180, the procedure causes the output $T_{M-RS}$ to be "1", and if less than 180, then causes the output $T_{M-RS}$ to be "0". After the output $T_{M-RS}$ has become "1", when the count of the counter $K_R$ is greater than 90, the procedure causes the output $T_{M-S}$ to be "1", and when less than 90, then causes the output $T_{M-RS}$ to be "0". Here, the count of the counter $K_R$ is to be saturated at 0 and 270, so that once the count has reached 270, it retains 270 even when more additions are made, and also once the count has reached 0, it retains 0 even when more substractions are made.

When the phase difference of two electrical quantities to be judged in terms of phase relationship is 90°, the counter $K_R$ performs additions of 90 times and subtractions of 90 times in the procedure of 180 times during half a cycle of electrical quantities, and although the count deviates in the width of 90 times, the range of deviation is invariable. In the state when the phase difference is greater than or equal to 90°, that is, when the relay is to be inoperative, the number of times of subtractions among the 180 times is greater than the number of times of additions therein, and the count of the counter $K_R$ becomes 0. Under this condition, when the phase difference is less than or equal to 90°, that is, when the relay is to be operative, the number of times of additions is greater than the number of times of subtractions, thus, the count increases successively, and when the count reaches 180, the output $T_{M-RS}$ turns to be "1". Also after this, additions and subtractions are repeatedly made, however, whenever the count is greater than 90 the output $T_{M-RS}$ is held at "1", and so long as the relay is in operative, the operation thereof is continued. After this, if the status is changed to inoperative, the count decreases successively, and when the count becomes less than 90, the output $T_{M-RS}$ is turned to "0". After this, unless the count becomes more than 180, the output $T_{M-RS}$ will not be "1", so that even when additions and subtractions of the count are repeatedly made, so long as the relay is in inoperative, the output $T_{M-RS}$ is retained at "0".

As described above, the embodiments according to the present invention include a variety of such manners as to detect the number of times of either coincidence or noncoincidence of logical states of the output signals (or signals delayed therefrom) of the comparators corresponding to the instantaneous values of two electrical quantities to be judged in terms of phase relationship.

Figure 25:
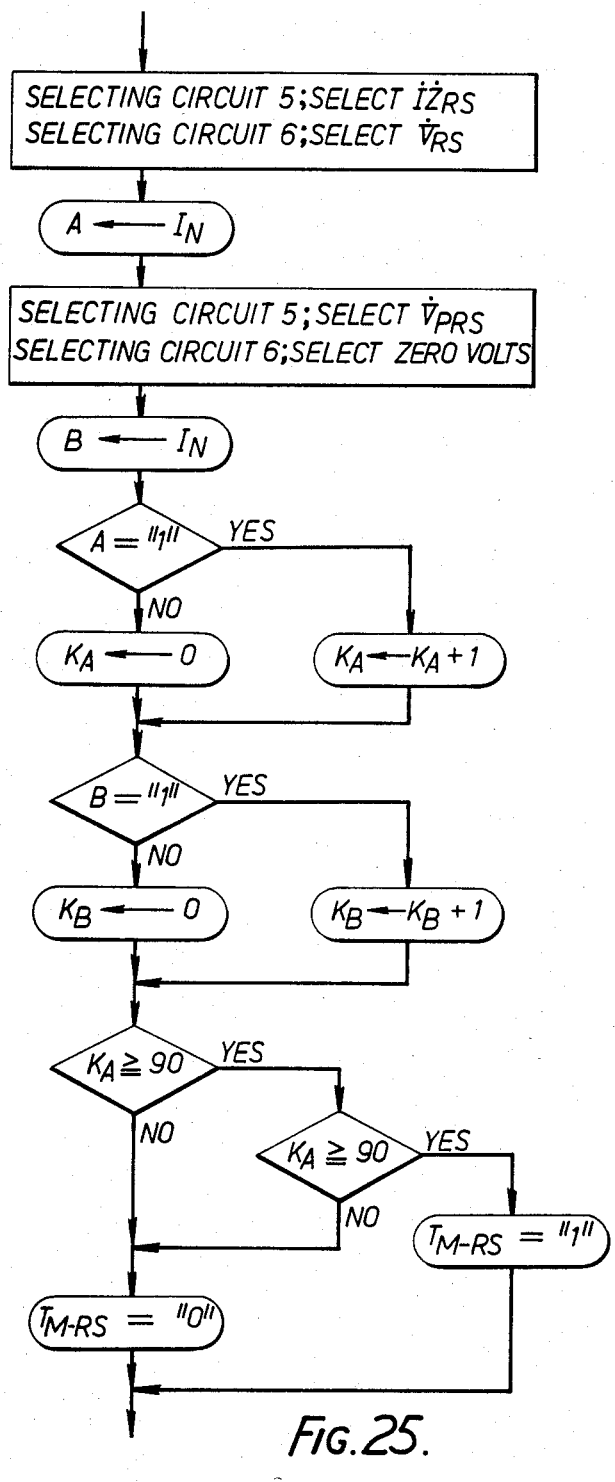

FIG. 25 shows a flowchart indicative of another embodiment according to the present invention, which may be utilized in place of STEP S1 of FIG. 5, and similar characteristics can be obtained therefrom. The flowchart shows the case when digital procedures are made at a rate of one time at every electrical angle of 1° of the input electrical quantities.

In FIG. 25, the flow of up to the step (B←$I_N$) is similar to that shown in FIG. 5. When the stored content of the register A is "1", the procedure adds 1 to the count of the counter $K_A$, and when it is "0", then resets the count to 0. When the stored content of the register B is "1", the procedure adds 1 to the count of the counter $K_B$, when it is "0", then resets the count to 0. When both the counts of the counters $K_A$ and $K_B$ are greater than or equal to 90, the procedure causes the output $T_{M-RS}$ to be "1", when otherwise, to be "0".

Figure 26:
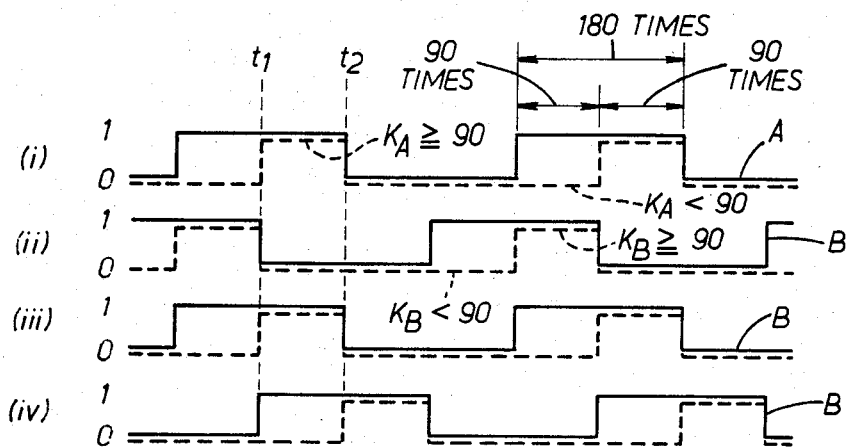
FIG. 26 is a waveform diagram illustrating responses of the flowchart shown in FIG. 25.

FIG. 26 shows a waveform diagram to explain the responding operations in this embodiment. A solid-line waveform (i) represents the envelope of the logical state of the register A, and solid-line waveforms (ii), (iii) and (iv) represent the envelopes of the logical states of the register B. The logical states of the stored contents of the registers A and B are "1" or "0" only at the instant at which the signals $A_{RS}(i)$ or $B_{RS}(i)$ appear on the input signal $I_N$, however, when illustrated in envelope, they can be represented as square waves which retain for a certain period of time. The number of times of succession in logical state "1" on the respective waveforms (i) to (iv) is 180 corresponding to a half cycle of the input electrical quantities, respectively, and the respective dotted lines indicate that whether $K_A \geq 90$ and $K_B \geq 90$ are held. When the logical states of the stored contents of the registers A and B are in the relationship between the waveforms (i) and (ii), that is, when the envelope of the logical state of the register B leads the envelope of that of A by 90°, the condition ($K_A \geq 90$ and $K_B \geq 90$) occurs at an instant $t_1$, and the output $T_{M-RS}$ is caused to be "1". When the phase of the envelope of the logical state of the register B lags behind the phase of the waveform (ii) and becomes in-phase to the phase of the envelope of the logical state of the register A as shown in (iii), the period in which the condition ($K_A \geq 90$ and $K_B \geq 90$) holds becomes the period between the instants $t_1$ and $t_2$. When the phase of the envelope of the logical state of the register B lags further, and becomes behind that of the logical state of the register A by 90° as shown in the waveform (iv), the instant at which the condition ($K_A \geq 90$ and $K_B \geq 90$) hold becomes the instant $t_2$. As described above, when the phase of the envelope of the logical state of the register B lies in the range of ±90° with respect to that of A, the period exists in which the condition ($K_A \geq 90$ and $K_B \geq 90$) holds and the output $T_{M-RS}$ is caused to be "1".

FIG. 26 also shows the phase condition under which the output $T_{M-RS}$ is caused to be "1" in the embodiment shown in FIG. 5. Namely, when the logical state of the stored content of the register A lies in the status (i) in FIG. 26, if the logical states of the stored content of the register B lie in the statuses (ii), (iii) and (iv), the number of times that both the logical states of the stored contents of the register A and B become "1" reaches greater than or equal to 90, and the output $T_{M-RS}$ is produced. Therefore, the phase condition under which the output $T_{M-RS}$ is caused to be "1" in the embodiment shown in FIG. 25 is equal to the condition under which the output $T_{M-RS}$ is caused to be "1" in the embodiment shown in FIG. 5.

This embodiment has the manner such that after both the enveloped waveforms of two sequential signals to be judged with respect to phase relationship have been transformed into the dotted line waveforms shown as example in FIG. 26, the procedure detects whether the logical states of such signals coincide with "1". As described above, only by detecting whether the specified logical condition holds on the basis of transformation of both the enveloped waveforms of two sequential signals, such a number of times that the enveloped waveform of two sequential signals (include at least one delayed signal therefrom) hold the specified logical condition can be detected. The present invention can also be realized by utilizing such manner as described above.

Figure 27:
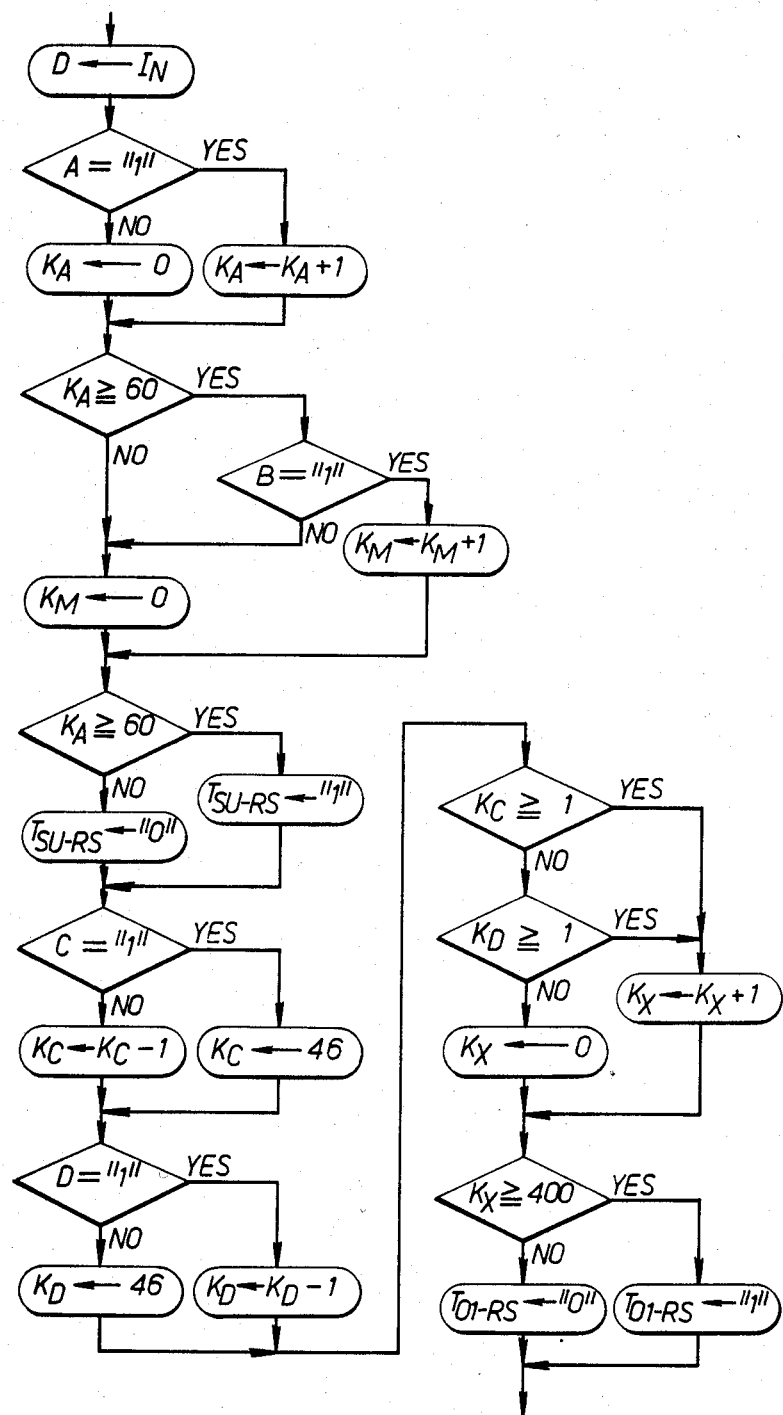
FIG. 27 is a flowchart illustrating operations of the microcomputer circuit of another embodiment of the present invention.

FIG. 27 shows a flowchart of signal processing in another embodiment of the present invention, which is applied to the embodiment of the structure shown in FIG. 20. In FIG. 27, the flow up to the step (D←$I_N$) is similar to that in FIG. 21, so that for simplicity, only the step (D←$I_N$) is shown, and the steps previous thereto are omitted. The signal processing is to be made at a rate of one time at every electrical angle of 1°, and the electrical quantity $I\dot{Z}_{RS}$ is defined, in this case, as an electrical quantity indicative of a current which leads the current ($I_R - I_S$) by 45°.

When the stored content of the register A is "1", the procedure adds 1 to the count of the counter $K_A$, and when is "0", then causes the count of the counter $K_A$ to be 0. When the count of the counter $K_A$ is greater than or equal to 60 and the stored content of the register B is "1", the procedure adds 1 to the count of the counter $K_M$, otherwise, causes the count of the counter $K_M$ to be 0. When the count of the counter $K_M$ reaches greater than or equal to 60, the procedure causes the output $T_{SU-RS}$ to be "1", when otherwise, causes the output $T_{SU-RS}$ to be "0".

When the stored content of the register C is "1", the procedure causes the count of the counter $K_C$ to be 46, when is 0, then subtracts 1 from the count of the counter $K_C$. When the stored content of the register D is "1", the procedure subtracts 1 from the count of the counter $K_D$, and when is 0, then causes the count of the counter $K_D$ to be 46. When the count of the counter $K_C$ is greater than or equal to 1 or the count of the counter $K_D$ is greater than or equal to 1, the procedure adds 1 to the count of the counter $K_X$, when otherwise, causes the count of the counter $K_X$ to be 0. When the count of the counter $K_X$ is greater than or equal to 400, the procedure causes the output $T_X$ to be "1", when otherwise, causes the output $T_X$ to be "0".

Figure 28:
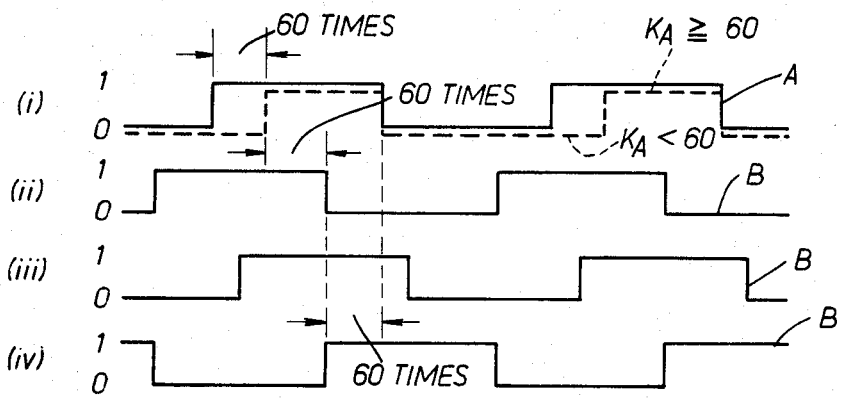
FIG. 28 and FIG. 29 are waveform diagrams illustrating responses of the flowchart shown in FIG. 27.

FIG. 28 shows a waveform diagram to illustrate the response in the above described embodiment, wherein the phase condition under which the output $T_{SU-RS}$ is caused to be "1" is illustrated. In the diagram, there are shown the enveloped waveforms such as the solid-line waveform (i) indicative of the stored content of the register A, the dotted-line waveform (i) indicative of that whether the count of the counter $K_A$ is greater than or equal to 60 ($K_A \geq 60$), and the solid-line waveforms (ii), (iii) and (iv) indicative of the stored content of the register B. In the case of the waveform (ii), the enveloped waveform of the stored content of the register B leads the enveloped waveform of the stored content of the register A by 60°. In this case, such a number of times that both the conditions ($K_A \geq 60$) and (B=1) hold is 60, and is such a limit that the output $T_{SU-RS}$ is caused to be "1". When the phase of the enveloped waveform of the register B lags behind the state (ii), that is, when the phase becomes the state (iii), such a number of times that both the conditions ($K_A \geq 60$) and (B=1) hold exceeds 60, in turn, the output $T_{SU-RS}$ is caused to be "1". When the phase of the enveloped waveform of the register B lags further, that is when the phase becomes the state (iv) which lags behind that of the register A by 120°, such a number of times that the conditions ($K_A \geq 60$) and (B=1) hold returns to 60, which is such a limit that the output $T_{SU-RS}$ is caused to be "1". As described above, so long as the phase of the enveloped waveform of the register B lies in the range of $+60°$ to $-120°$ with respect to the enveloped waveform of the register A, the output $T_{SU-RS}$ is caused to be "1". The status wherein the stored contents of the registers A and B are caused to be 1 is the time when the instantaneous values of the respective electrical quantities $\dot{V}_{PRS}$ and $(\dot{I}\dot{Z}_{RS} - \dot{V}_{RS}/M)$ are positive. So the status wherein the output $T_{SU-RS}$ is caused to be "1" is the time when the phase of the electrical quantity $(\dot{I}\dot{Z}_{RS} - \dot{V}_{RS}/M)$ with respect to that the electrical quantity $\dot{V}_{PRS}$ lies in the range of $+60°$ to $-120°$.

Figure 29:
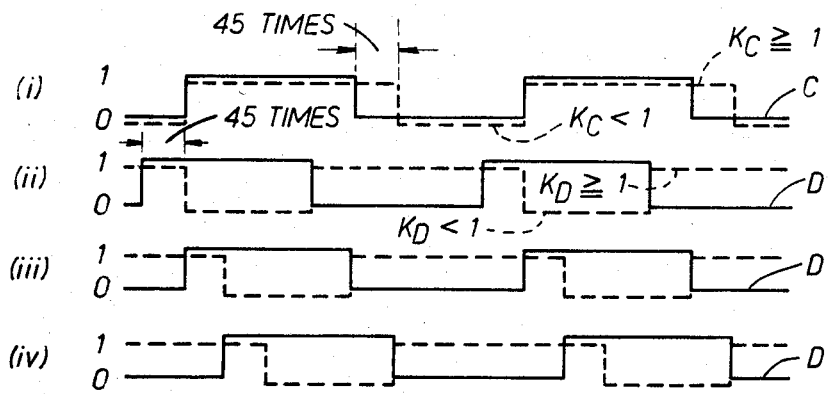

FIG. 29 shows a waveform diagram to illustrate the phase condition wherein the output $T_X$ is caused to be "1". In the diagram, there are shown the enveloped waveforms such as the solid-line waveform (i) indicative of the stored content of the register C, the dotted-line waveform (i) indicative of the condition whether the count of the counter $K_C$ is greater than or equal to 1 ($K_C \geq 1$), the solid-line waveforms (ii), (iii) and (iv) indicative of the stored content of the register D, and the dotted-line waveforms (ii), (iii) and (iv) indicative of the condition whether the count of the counter $K_D$ is greater than or equal to 1 ($I_D \geq 1$). The phase relationship of the enveloped waveform of the register D with respect to the enveloped waveform of the register C is such that it leads by 45° in the waveform (ii), in-phase in the waveform (iii), and lags by 45° in the waveform (iv). In either case of the waveform (ii), (iii) and (iv), at least either one of the counts of the counters $K_C$ and $K_D$ is held greater than or equal to 1 during the entire period, and this is the limit wherein the waveforms (ii) and (iii) hold that status. In this status, the counter $K_X$ is caused to continue to add 1 to the count thereof, which, then, becomes greater than or equal to 400, and the output $T_X$ is caused to be "1". In the case of the outside of the limits of the waveforms (ii) and (iv), the status, which is not such status that wherein at least either one of the counts of the counters $K_C$ or $K_D$ is held greater than or equal to 1, inevitably occurs somewhere during every one cycle, so that the count of the counter $K_X$ can never be greater than or equal to 400, thus the output $T_X$ never becomes "1". Therefore, when the phase of the enveloped waveform of the register D lies in the range of $\pm 45°$ with respect to the enveloped waveform of the register C, the output $T_X$ is caused to be "1". The status wherein the stored contents of the registers C and D become "1", respectively is the time when the instantaneous values of the respective electrical quantities $\dot{I}\dot{Z}_{RS}$ and $(\dot{I}\dot{Z}_{RS} - \dot{V}_{RS}/X_1)$ are positive, so that the status wherein the output $T_X$ is caused to be "1" is the time when the electrical quantity $(\dot{I}\dot{Z}_{RS} - \dot{V}_{RS}/X_1)$ lies in the range of $\pm 45°$ with respect to the electrical quantity $\dot{I}\dot{Z}_{RS}$.

Figure 30:
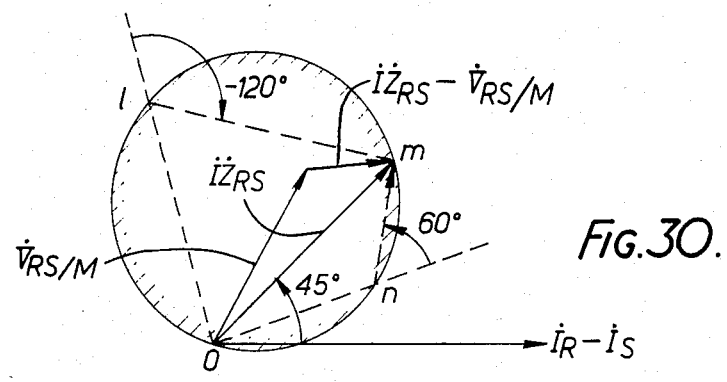
FIG. 30 and FIG. 31 are vector diagrams illustrating characteristics of the flowchart shown in FIG. 27.

The characteristics of the aforementioned embodiment will be described with reference to the drawings. FIG. 30 is a vector diagram illustrating the condition under which the output $T_M$ is caused to be "1". In FIG. 30, when the current $(\dot{I}_R - \dot{I}_S)$ is defined as the vector $(\dot{I}_R - \dot{I}_S)$, the vector of the electrical quantity $\dot{I}\dot{Z}_{RS}$ becomes the vector which leads the current $(\dot{I}_R - \dot{I}_S)$ by 45° as shown in the diagram. A circular arc onm is the locus of the point n at which the vector nm leads by 60° with respect to the vector on (the vector provided with the origin o and the head n), and a circular arc olm is the circular arc in which the vector lm lags behind the vector ol by 120°. When the vector $\dot{V}_{RS}/M$ lies within the circle defined by these circular arcs, the electrical quantity $(\dot{I}\dot{Z}_{RS} - \dot{V}_{RS}/M)$ lies in the range of $+60°$ to $-120°$ with respect to the electrical quantity $\dot{V}_{PRS}$ (where the electrical quantity $\dot{V}_{PRS}$ is invariably in-phase to the electrican quantity $\dot{V}_{RS}$), thus the output $T_M$ is caused to be "1".

Figure 31:
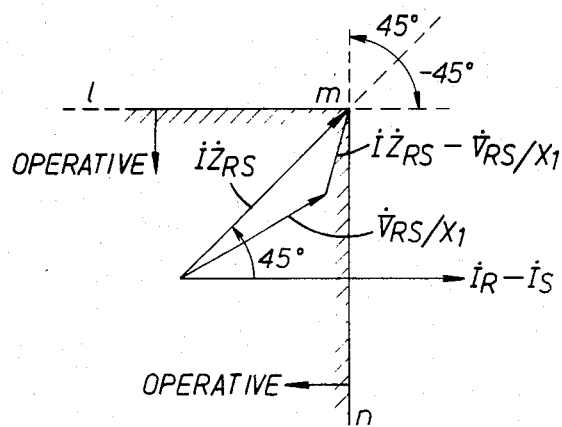

FIG. 31 shows a vector diagram to illustrate the condition under which the output $T_X$ is caused to be "1". A two-slope line lmm is parts of the lines provided with an angle of $\pm 45°$ with respect to the vector $\dot{I}\dot{Z}_{RS}$. When the vector $\dot{V}_{RS}/X_1$ lies within the operating region defined by the two-slope line lmn, the electrical quantity $(\dot{I}\dot{Z}_{RS} - \dot{V}_{RS}/X_1)$ lies in the range of $\pm 45°$ with respect to the electrical quantity $\dot{I}\dot{Z}_{RS}$, thus the output $T_X$ is caused to be "1".

In the embodiment shown in FIG. 27, the manner to obtain the condition under which the output $T_M$ is caused to be "1" is made by detecting the number of times that a specified logical condition (in this case, coincides with a logical state "1", which the condition ($K_A \geq 60$) is defined as "1") is held. Here, the detection is made after transformation of the enveloped waveform of one of the two sequential signals corresponding to the two electrical quantities to be judged in terms of phase relationship thereof. Further, the manner to obtain the condition under which the output $T_X$ is caused to be "1" is made by defection the number of times that a specified logical condition (in this case, either one of the two is "1", where the conditions ($K_C \geq 1$ and $K_D \geq 1$) are defined as "1".) is held. Here, the detection is made after transformation of the enveloped waveforms of both the two sequential signals corresponding to the two electrical quantities to be judged in terms of the phase relationship thereof. As described above, the present invention includes the manner which is made by detection utilizing the number of times that a specified logical condition is held after the various transformation of either one of enveloped waveforms of the sequential signals to be judged in terms of the phase relationship thereof have been made.

Figure 32:
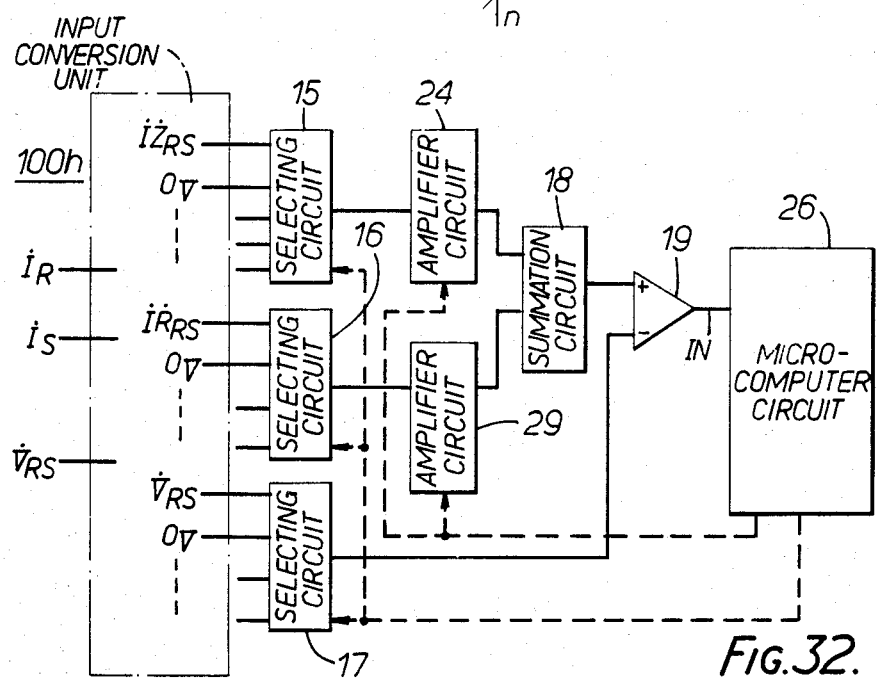
FIG. 32 is a block diagram illustrating the other embodiment of the present invention.
Figure 33:
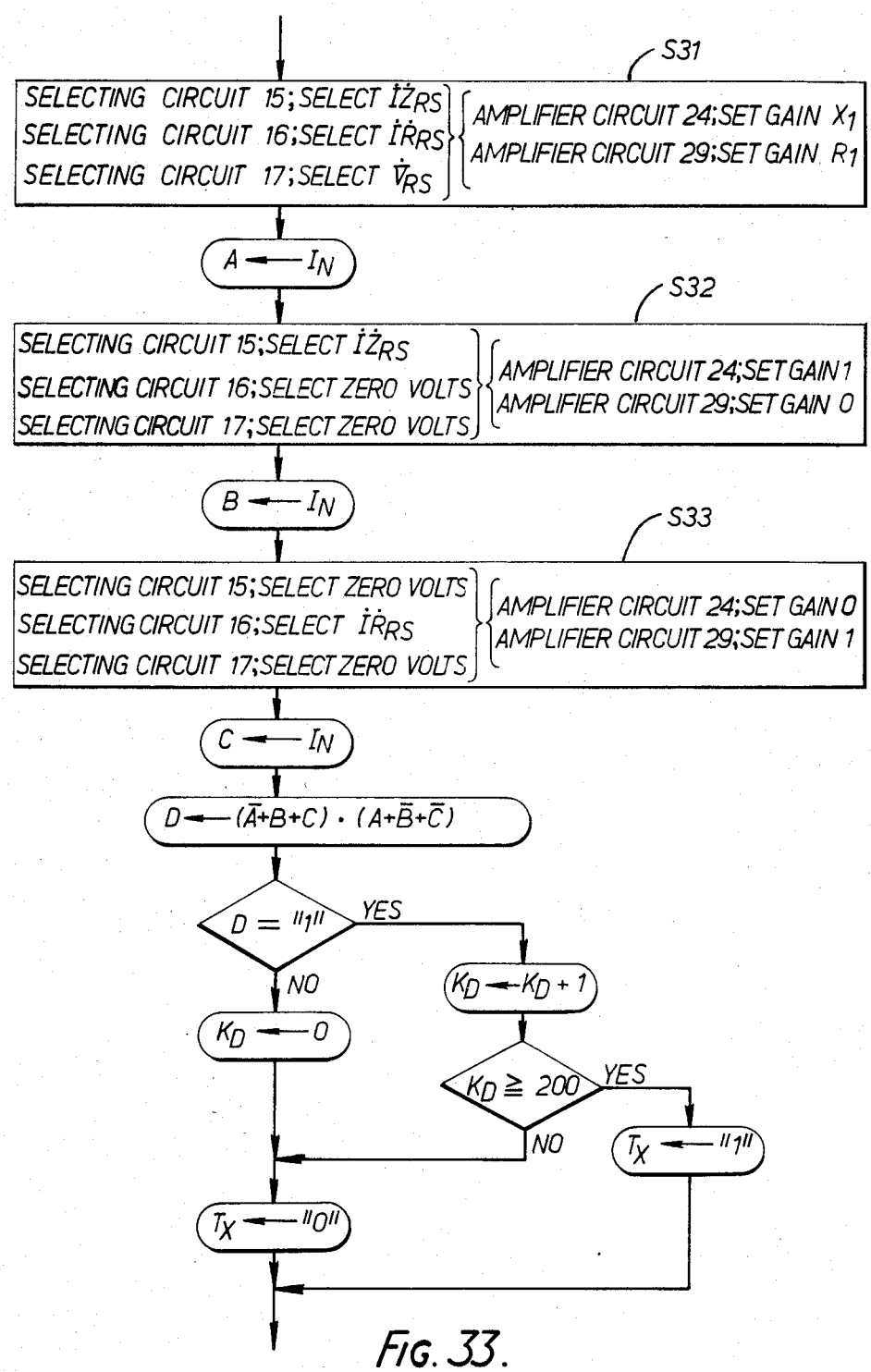
FIG. 33 is a flowchart illustrating operations of the microcomputer circuit shown in FIG. 32.

FIG. 32 shows a block diagram to illustrate the structure of another embodiment according to the present invention. The structure shown in FIG. 32 differs from that of FIG. 16 in that there are provided amplifier circuits 24 and 29 between selecting circuits 15 and 16 and a summation circuit 18. In FIG. 32, reference numeral 100h designate an input conversion unit which receives electrical quantities $\dot{I}_R$, $\dot{I}_S$ and $\dot{V}_{RS}$ and outputs electrical quantities $\dot{I}\dot{Z}_{RS}$, $\dot{I}\dot{R}_{RS}$ and $\dot{V}_{RS}$ and zero volts. The electrical quantity $\dot{I}\dot{R}_{RS}$ is an electrical quantity indicative of a current which is proportional and in-phase to the current $(\dot{I}_R - \dot{I}_S)$. By utilizing this structure the distance relay with various characteristics can be realized, however, only the detection manners that particularly differ from the aforementioned embodiments will be described. FIG. 33 shows a flowchart to illustrate the flow of signal processing of such detection manners in the case that the signal processings are made at a rate of one time at every electrical angle of 1°.

First, in the first step, that is, in STEP S31 the selecting circuits 15, 16 and 17 are caused, by selecting signals outputted from a microcomputer circuit 26, to select the electrical quantities $\dot{I}\dot{Z}_{RS}$, $\dot{I}\dot{R}_{RS}$ and $\dot{V}_{RS}$, respectively. While at the same time, the amplifier circuits 24 and 29 are caused, by control signals outputted from the microcomputer circuit 26, to set the respective gain thereof to $X_1$ and $R_1$, thus, output electrical quantities $X_1\dot{I}\dot{Z}_{RS}$ and $R_1\dot{I}\dot{R}_{RS}$, respectively. These outputs are supplied to the summation circuit 18 so as to obtain the output of $(X_1\dot{I}\dot{Z}_{RS} + R_1\dot{I}\dot{R}_{RS})$. This output and the output $\dot{V}_{RS}$ of the selecting circuit 17 are supplied to the positive and negative input terminals of the comparator 19, respectively. When the difference of the outputs, $(X_1\dot{I}\dot{Z}_{RS} + R_1\dot{I}\dot{R}_{RS} - \dot{V}_{RS})$, is positive at the instant at which they were selected, the output logical state signal of the comparator 19 becomes "1", and when negative or zero, then becomes "0". This output is received by the microcomputer circuit 26 as an input signal $\dot{I}_N$, and transferred to a register A.

In a step S32, input selection and gain establishment shown in the flowchart permit the comparator 19 to receive the output $\dot{I}\dot{Z}_{RS}$ of the summation circuit 18 and the output zero volt of the selecting circuit 17, and when the electrical quantity $\dot{I}\dot{Z}_{RS}$ is positive, the output logical state signal of the comparator 19 becomes "1", and when negative or zero, then becomes "0". This output is received by the microcomputer circuit 26 as the input signal $\dot{I}_N$, and transferred to a register B. Further, in the following step S33, input selection and gain establishment shown in the flowchart permit the comparator 19 to produce the output of a logical state "1" when the electrical quantity $\dot{I}\dot{R}_{RS}$ is positive, and when negative or zero, then to produce a logical state "0". This output is received by the microcomputer circuit 26 as the input signal $\dot{I}_N$, and transferred to a register C.

After these signal processings, a logical state of $(\overline{A}+B+C) \cdot (A+\overline{B}+\overline{C})$ is transferred to a register D. When the stored content of the register D is "1", the procedure adds 1 to the count of the counter $K_D$, further detects whether the count is greater than or equal to 200, and when the count is greater than or equal to 200, then causes the output $T_X$ to be "1". When the stored content of the register D is "0", the count of the counter $K_D$ is caused to be 0.

Figure 34:
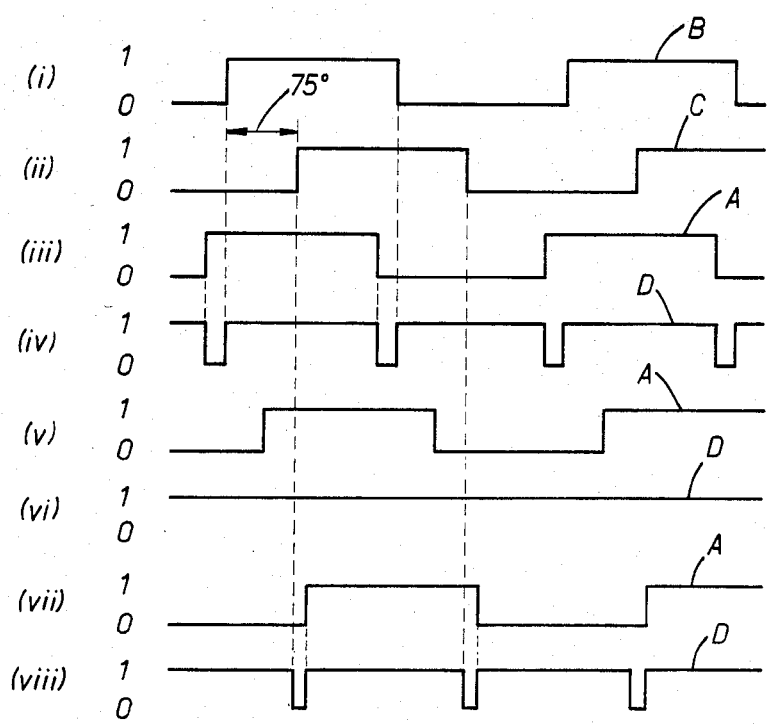
FIG. 34 is a waveform diagram illustrating responses of the microcomputer circuit shown in FIG. 32.

The responses in this embodiment will be described with reference to the drawings. FIG. 34 is a waveform diagram to illustrate the phase conditions under which the output $T_X$ is caused to be "1". In FIG. 34, the waveforms (i) and (ii) represent the enveloped waveforms indicative of the stored contents of the respective registers B and C. The waveform of the register B leads the waveform of the register C by 75° (the angle by which the electrical quantity $\dot{I}\dot{Z}_{RS}$ leads the electrical quantity $\dot{I}\dot{R}_{RS}$, and defined as 75°) and this relationship is invariable. The waveforms (iii), (V) and (Vii) respectively represent the enveloped waveforms of the stored content of the register A in the respectively different phases such as when leading the enveloped waveform of the content of the register B by some angles, when lagging behind the enveloped waveform of that of B and leading the enveloped waveform of the of C, and when lagging behind the enveloped waveform of that of C by some angles. The waveforms (iv), (Vi) and (Vii) represent the enveloped waveforms of the stored content of the register D in the cases such as when the enveloped waveform of the stored contents of the register A are the waveforms (iii), (V) and (Vii), respectively and for either cases, when the enveloped waveforms of the stored contents of the registers B and C are the waveforms (i) and (ii), respectively. In the cases of the waveforms (iV) and (Viii), the period in which $(\overline{A}+B+C) \cdot (A+\overline{B}+\overline{C})$, that is, the stored content of the register D, becomes "0" appears at a rate of one time at every half cycle, as shown in the diagram, so that the count of the counter $K_D$ can never be greater than or equal to 200 (a half cycle means 180 times), thus the output $T_X$ is not caused to be "1". In the case of the waveform (Vi), since the stored content of the register D continuously holds "1", the count of the counter $K_D$ becomes greater than or equal to 200, thus the output $T_X$ is caused to be "1". The case when the stored content of the register D continuously holds "1" is the case when the enveloped waveform of the register A lags behind the enveloped waveform of the register B, and leads the enveloped waveform of the register C, and under this condition, the output $T_X$ is caused to be "1". The case when the stored contents of the registers A, B and C are respectively "1" is the case when the instantaneous values at the selected instant of the respective electrical quantities $(X_1\dot{I}\dot{Z}_{RS} + R_1\dot{I}\dot{R}_{RS} - \dot{V}_{RS})$, $\dot{I}\dot{Z}_{RS}$ and $\dot{I}\dot{R}_{RS}$ are positive, so that when the electrical quantity $(X_1\dot{I}\dot{Z}_{RS} + R_1\dot{I}\dot{R}_{RS} - \dot{V}_{RS})$ lags behind the electrical quantity $\dot{I}\dot{Z}_{RS}$ and leads the electrical quantity $\dot{I}\dot{R}_{RS}$, the output $T_X$ is caused to be "1".

Figure 35:
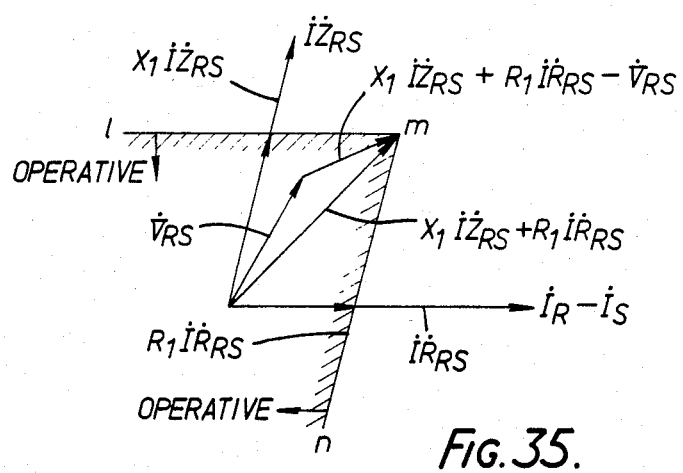
FIG. 35 is a vector diagram illustrating characteristics of the microcomputer circuit shown in FIG. 32.

FIG. 35 shows a vector diagram to illustrate the condition under which the output $T_X$ is caused to be "1". In FIG. 35, a two-slope line lmn consists of two liner portions passing the head of the vector $(X_1\dot{I}\dot{Z}_{RS} + R_1\dot{I}\dot{R}_{RS})$ and parallel with the vector $\dot{I}\dot{Z}_{RS}$ and $\dot{I}\dot{R}_{RS}$. When the vector $\dot{V}_{RS}$ lies in the operative region defined by the two-slope line lmn as shown, it indicates that the electrical quantity $(X_1\dot{I}\dot{Z}_{RS} + R_1\dot{I}\dot{R}_{RS} - \dot{V}_{RS})$ lags behind the electrical quantity $\dot{I}\dot{Z}_{RS}$, and leads the electrical quantity $\dot{I}\dot{R}_{RS}$, so that the output $T_X$ is caused to be "1".

In the above described embodiment, the system functions to judge the phase relationship between three electrical quantities such as $(X_1\dot{I}\dot{Z}_{RS} + R_1\dot{I}\dot{R}_{RS} - \dot{V}_{RS})$, $\dot{I}\dot{Z}_{RS}$ and $\dot{I}\dot{R}_{RS}$, and to detect the judged result by utilizing three sequential signals corresponding to the instantaneous values of such electrical quantities. The electrical quantities to be judged in terms of the phase relationship therebetween may be increased in number. For example, four electrical quantities such as $(X_1 \dot{I} \dot{Z}_{RS} + R_1 I R_{RS} - \dot{V}_{RS})$, $(X_1 \dot{I} \dot{Z}_{RS} - R_2 I R_{RS} - \dot{V}_{RS})$, $(-X_2 \dot{I} \dot{Z}_{RS} - R_3 I R_{RS} - \dot{V}_{RS})$ and $(-X_3 \dot{I} \dot{Z}_{RS} - R_4 I R_{RS} - \dot{V}_{RS})$ (where, $X_2$, $X_3$, $R_2$, $R_3$ and $R_4$ are positive constants) are also applicable. When the respective instantaneous values of such four electrical quantities are positive, the procedure causes the logical states of the respective registers A, B, C and D to be "1". Further the procedure judges whether the logical condition $(A+B+C+D) \cdot (\overline{A}+\overline{B}+\overline{C}+\overline{D})$ is "1", or whether this logical condition continues greater than or equal to a specified constant number greater than that corresponding to the half cycle of the respective electrical quantities (when signals are processed at a rate of one time at every electrical angle of 1°, for example, 200), then causes the output to be produced. In this case, a distance relay provided with operation characteristics of quadrilateral characteristic can be obtained, however because of simplicity, detailed descriptions are omitted.

As described above, the present invention includes a variety of manners such that the electrical quantities to be judged in terms of phase relationship are not limited to two in number, but more than two, namely, plural electrical quantities may be judged in the phase relationship thereof by utilizing the logical condition of the plural sequential signals obtained from these electrical quantities.

Figure 36:
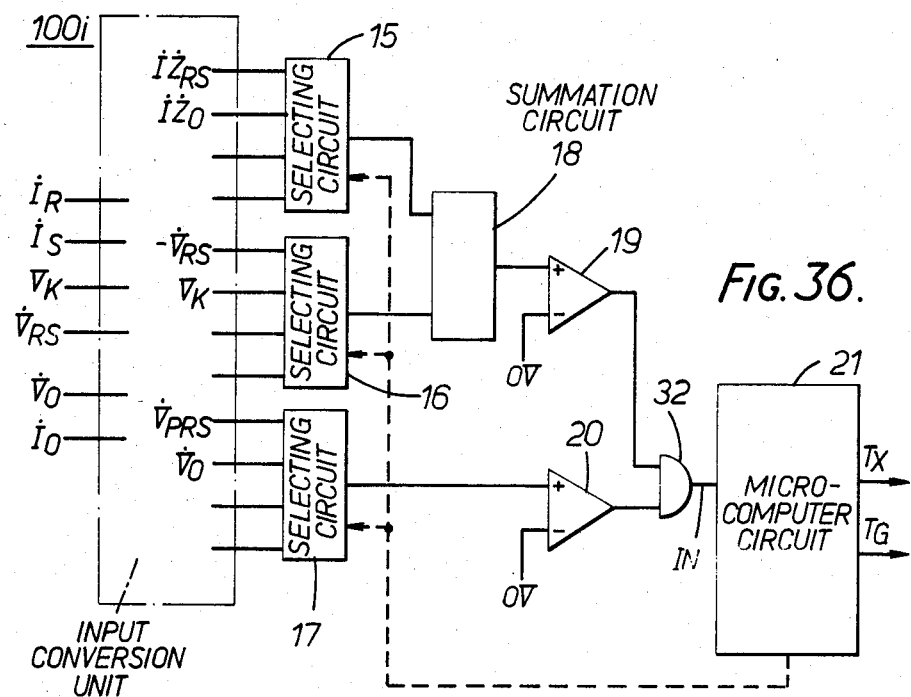
FIG. 36 is a block diagram illustrating another embodiment of the present invention.

FIG. 36 shows a block diagram to illustrate the structure of another embodiment according to the present invention. In FIG. 36, reference numeral 100i designates an input conversion unit which receives currents $\dot{I}_R$ and $\dot{I}_S$, a zero-phase current $\dot{I}_O$, a voltage $\dot{V}_{RS}$, a zero-phase voltage $\dot{V}_O$ and a DC electrical quantity $\dot{V}_K$ and outputs electrical quantities $\dot{I} \dot{Z}_{RS}$, $\dot{I} \dot{Z}_O$, $(-\dot{V}_{RS})$, $\dot{V}_K$, $\dot{V}_{PRS}$ and $\dot{V}_O$. Here, $\dot{I} \dot{Z}_O$ represents an electrical quantity which is in the constant phase relationship with and proportional to the zero-phase current $\dot{I}_O$, and $\dot{V}_O$ represents an electrical quantity which is in-phase to and proportional to the zero-phase voltage. Reference numeral 32 designates an AND circuit. The embodiment in FIG. 36 differs from that in FIG. 16 only in that the above mentioned electrical quantities are applied, and the output signals of comparators 19 and 20 are supplied to the AND circuit 32, in turn, the output thereof is supplied to a microcomputer circuit 21.

In this embodiment, a logical state of the output $T_X$ can be obtained by signal processing similar to that in FIG. 17. Namely, the registers A and B are omitted, the microcomputer circuit 21 receives the output signal of the AND circuit 32 as the input signal $I_N$, and transfers this signal to a register C. The stored content of the register C obtained by such procedure is identical to the content obtained by the flowchart of FIG. 17, and thereafter the similar processings are made to cause the output $T_X$ to similarly respond.

As described above, by utilizing a plurality of comparators, plural sequential signals corresponding to plural electrical quantities to be detected in terms of the phase relationship therebetween can be simultaneously obtained, and the use of logic circuit enables the system to detect whether the specified logical conditions are held. The present invention includes these manners.

Figure 37:
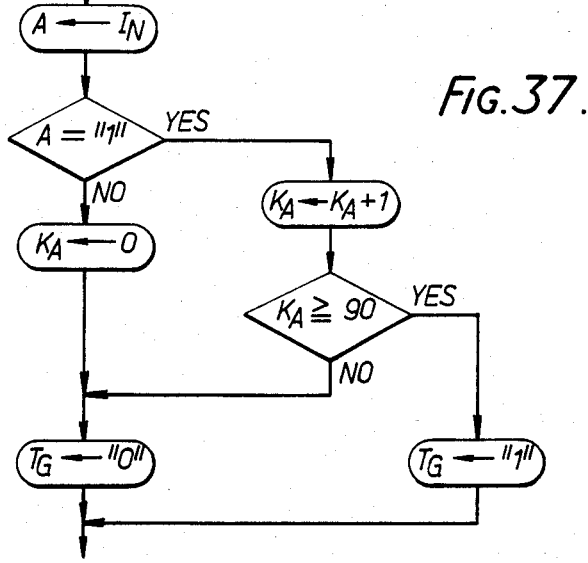
FIG. 37 is a flowchart illustrating operations of the microcomputer circuit shown in FIG. 36.

FIG. 37 shows a flowchart of signal processing to obtain another output $T_G$ of embodiment shown in FIG. 36. The flowchart illustrates that the case signal processings are made at a rate of one time at every electrical angle of 1°. First, the procedure causes the selecting circuits 15, 16 and 17 to select the respective electrical quantities $\dot{I} \dot{Z}_O$, $(-\dot{V}_K)$ and $\dot{V}_O$. This renders the output of the summation circuit 18 to be the electrical quantity $(\dot{I} \dot{Z}_O - \dot{V}_K)$. When this electrical quantity $(\dot{I} \dot{Z}_O - \dot{V}_K)$ is positive, the comparator 19 produces the output signal "1". When the electrical quantity $\dot{V}_O$ is positive, the comparator 20 produces the output signal "1". When both the output signals of the comparators 19 and 20 become "1", the output signal of the AND circuit 32, that is, the input signal $I_N$ of the microcomputer circuit 21 turns to be "1". This signal is transferred to a register A, and when the stored content of the register A is "1", the procedure adds 1 to the count of the counter $K_A$. Further, the procedure judges whether the count of the counter $K_A$ is greater than or equal to 90, and if so, causes the output $T_G$ to be "1". When the stored content of the register A is "0", the procedure causes the count of the counter $K_A$ to be 0. In this case and in the case when the count is less than 90, the procedure causes the output $T_G$ to be "0".

Figure 38:
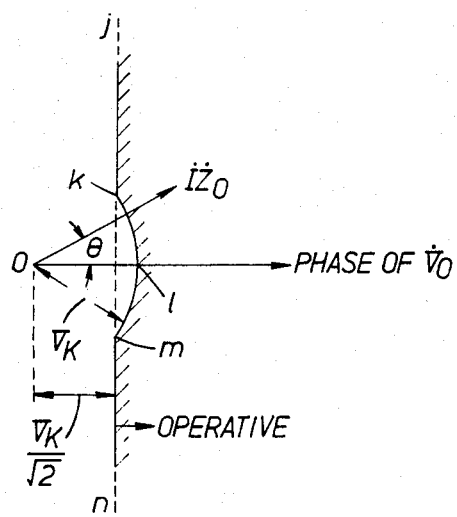
FIG. 38 is a vector diagram illustrating responses of the microcomputer circuit shown in FIG. 36.
Figure 39:
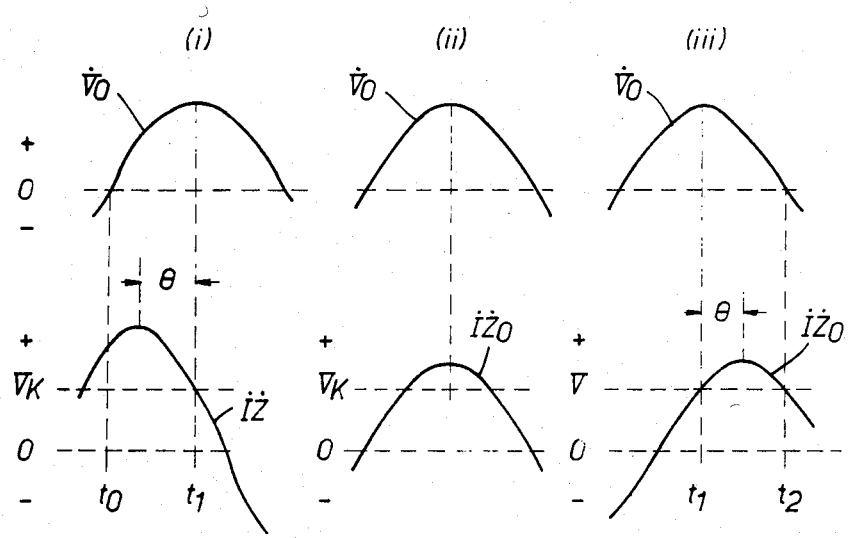

The response in this embodiment will be described with reference to FIG. 38, which shows a vector diagram to illustrate the condition under the output $T_G$ is caused to be "1". In FIG. 38, when the electrical quantity $\dot{I} \dot{Z}_O$ lies in the operative region with reference to the phase of the electrical quantity $\dot{V}_O$, the output $T_G$ is caused to be "1". This operative region is defined by such linear portions jk and mn that the in-phase components thereof with respect to the electrical quantity $\dot{V}_O$ becomes the electrical quantity $$\frac{V_k}{\sqrt{2}}$$

and the circular arc klm of the radius $\dot{V}_K$. The operative region is independent of the magnitude of the electrical quantity $\dot{V}_O$. FIG. 39 is a waveform diagram to illustrate the above-described operation characteristics. In FIG. 39, (i) shows waveforms in the case when the electrical quantity $\dot{I} \dot{Z}_O$ leads the electrical quantity $\dot{V}_O$ by $\theta$ (where, between 45° to 90°), and the operative condition is such that the maximum value of the electrical quantity $\dot{I} \dot{Z}_O$ is greater than the electrical quantity $\dot{V}_K$ during the period between the instant $t_0$ at which the instantaneous value of $\dot{V}_O$ passes across from negative to positive and the instant $t_1$ at which the instantaneous value of $\dot{V}_O$ reaches the maximum value thereof. Under this condition, during the period in which the electrical quantity $\dot{V}_O$ is positive the electrical quantity $(\dot{I} \dot{Z}_O - \dot{V}_K)$ becomes positive for a period greater than or equal to 90°, and the count of the counter $K_A$ becomes greater than or equal to 90. Under the above-described condition, the condition of the electrical quantity $\dot{I} \dot{Z}_O$ can be expressed by $$\sqrt{2} \, |\dot{I} \dot{Z}| \cos\theta \geqq V_K \tag{1}$$

Where $|\dot{I} \dot{Z}|$ represents the effective value of the electrical quantity $\dot{I} \dot{Z}$. The limit of this condition is defined as the line kj shown in FIG. 38.

The waveforms (ii) in FIG. 39 shows the case when the phase of the electrical quantity $\dot{I} \dot{Z}_O$ lies in the range of ±45° with respect to that of the electrical quantity $\dot{V}_O$. In this case, the operative condition becomes such that the instantaneous value of the electrical quantity $\dot{I} \dot{Z}_O$ is greater than the electrical quantity $\dot{V}_K$ during the period of greater than or equal to 90°. This condition can be expressed by $$\sqrt{2} \ |\dot{I}\dot{Z}| \cos 45° \geq V_K \quad (2)$$

The limit of this condition is defined as the circular arc klm shown in FIG. 38.

The waveforms (iii) in FIG. 39 shows the case when the electrical quantity $\dot{I}\dot{Z}_O$ lags behind the electrical quantity $\dot{V}_O$ by $\theta$ (where, between 45° to 90°). In this case, the operative condition becomes such that the instantaneous value of the electrical quantity $\dot{I}\dot{Z}_O$ is greater than the electrical quantity $K_A$ ($K_A \geq 90$) during the period between the instant $t_1$ and the instant $t_2$ at which the instantaneous value of $\dot{V}_O$ passes across from positive to negative. This condition can be expressed by an equation similar to the equation (1), and the limit thereof is defined as the line mn shown in FIG. 38.

In this embodiment, the instantaneous value of the alternating electrical quantity $\dot{I}\dot{Z}_O$ and the direct current electrical quantity $\dot{V}_K$ are selected by the selecting circuits, and when the instantaneous value of the alternating electrical quantity $\dot{I}\dot{Z}_O$ is greater than the direct current electrical quantity $\dot{V}_K$ (that is, the instantaneous value of $\dot{I}\dot{Z}_O$ lies in a direction more positive than $\dot{V}_K$), the sequential signal obtained by the comparator is caused to be "1". As described above, the embodiment can be executed by such manner as not only to obtain the sequential signals responding to whether the instantaneous value of the selected alternating electrical quantity is merely positive or negative, but also to obtain the sequential signals responding to whether such instantaneous value lies within the predetermined range (for example, greater than $\dot{V}_K$), and to detect the phase relationship between the enveloped waveforms of these sequential signals and other sequential signals (in this example, those corresponding to $\dot{V}_O$). The present invention includes such embodiment described above. By utilizing such manner, the embodiment can be executed not only to respond merely to the ratio of voltages and currents, but also to detect other relationship between voltages and currents, for example, to detect which region the vector of the current $\dot{I}_O$ resides in with respect to the phase of the voltage $\dot{V}_O$ as the reference phase shown in FIG. 38, so as to make a distance relay.

Figure 40:
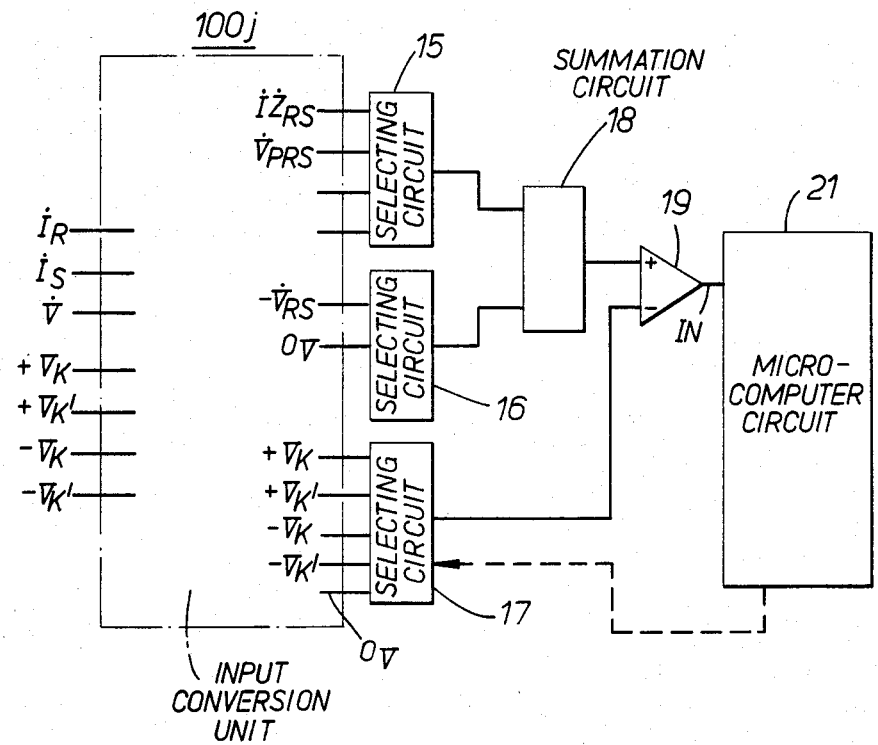
FIG. 40 is a block diagram illustrating the other embodiment of the present invention.

The above described manner to detect whether the instantaneous value of the alternating electrical quantities resides in the predetermined region defined by the values other than zero can be utilized to the distance relay described in the other aforementioned embodiments. FIG. 40 shows a block diagram to illustrate the structure of another embodiment according to the present invention. In FIG. 40, reference numeral 100j designates an input conversion unit which receives electrical quantities $\dot{I}_R$, $\dot{I}_S$, $\dot{V}_{RS}$, $\dot{V}_K$, $\dot{V}_{K'}$, $(-\dot{V}_K)$ and $(-\dot{V}_{K'})$ and outputs electrical quantities $\dot{I}\dot{Z}_{RS}$, $\dot{V}_{PRS}$, $(-\dot{V}_{RS})$ $\dot{V}_K$, $\dot{V}_{K'}$, $(-\dot{V}_K)$ and $(-\dot{V}_{K'})$ and zero volts. The structure shown in FIG. 40 is the same as that shown in FIG. 16, except as follows: The output of the selecting circuit 17 is applied to the negative input terminal of the comparator 19. The comparator 20 is omitted, so that only the output signal of the comparator 19 is received by a microcomputer circuit 21 as the input signal $\dot{I}_N$. The input electrical quantities of the selecting circuits 15, 16 and 17 are the electrical quantities $\dot{I}\dot{Z}_{RS}$ and $\dot{V}_{PRS}$, the electrical quantity $(-\dot{V}_{RS})$ and zero volts, and the electrical quantities $\dot{V}_K$, $\dot{V}_{K'}$, $(-\dot{V}_{K'})$ and $(-\dot{V}_K)$ and zero volts, respectively, as shown in FIG. 40. Other parts are identical to those shown in FIG. 16.

Figure 41:
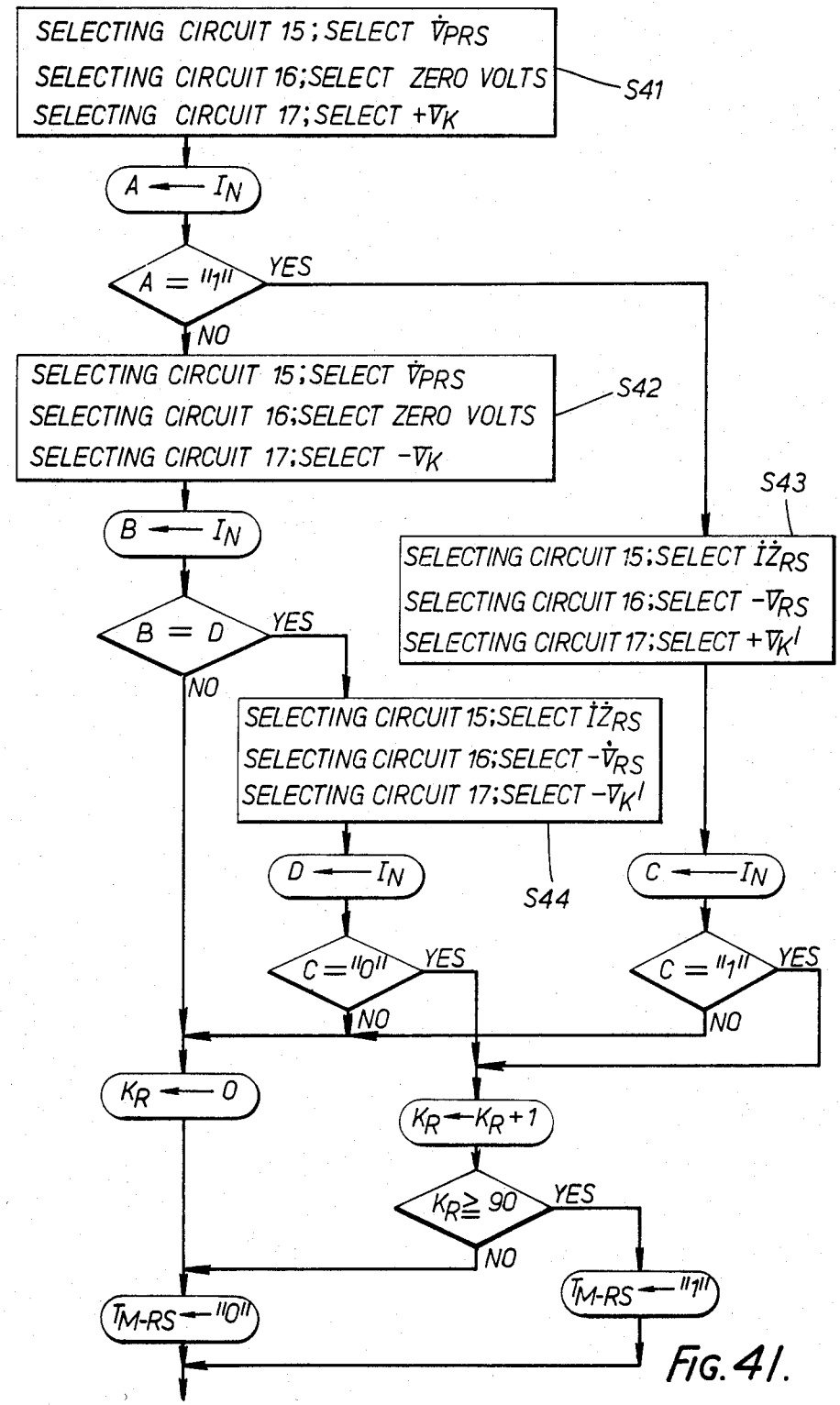
FIG. 41 is a flowchart illustrating operations of the microcomputer circuit shown in FIG. 40.

FIG. 41 is a flowchart to illustrate particular steps different from those of other aforementioned embodiments in terms of signal processing. First, in the step S41, the procedure causes the selecting circuits 15, 16 and 17 to select the respective electrical quantities $\dot{V}_{PRS}$ zero volts and the constant direct current electrical quantity $\dot{V}_K$. Under this condition, the output signal of the comparator 19 is received by the microcomputer circuit 21 as the input signal $\dot{I}_N$, and transferred to a register A. When the instantaneous value of the electrical quantity $\dot{V}_{PRS}$ is greater than the electrical quantity $\dot{V}_K$ (that is $\dot{V}_{PRS} > \dot{V}_K$), the output signal of the comparator 19 becomes "1", and the content of the register A becomes "1", in turn, the procedure moves to a step S43. In the step S43, the procedure causes the selecting circuits 15, 16 and 17 to respectively select the electrical quantity $\dot{I}\dot{Z}_{RS}$, $(-\dot{V}_{RS})$ and $+\dot{V}_{K'}$, and the resultant signal is received as the input signal $\dot{I}_N$, then transferred to a register C. Under this condition, when the instantaneous value of the electrical quantity $(\dot{I}\dot{Z}_{RS} - \dot{V}_{RS})$ is greater than the electrical quantity $\dot{V}_{K'}$ (that is, $\dot{I}\dot{Z}_{RS} - \dot{V}_{RS} > \dot{V}_{K'}$), the stored content of the register C becomes "1".

When the stored content of the register A is "0", the procedure advances to a step S42. In the step S42, the procedure causes the selecting circuits 15, 16 and 17 to select the electrical quantities $\dot{V}_{PRS}$, zero volts and $(-\dot{V}_K)$, respectively, and the resultant signal is received as the input signal $\dot{I}_N$, then transferred to a register B. Under this condition, when the electrical quantity $\dot{V}_{PRS}$ is greater than the electrical quantity $(-\dot{V}_K)$, (that is, $\dot{V}_{PRS} > -\dot{V}_K$), the stored content of the register B becomes "1". When the stored content of the register B is "0", the procedure advances to a step S44. In the step S44, the procedure causes the selecting curcuits 15, 16 and 17 to select the electrical quantities $\dot{I}\dot{Z}_{RS}$, $(-\dot{V}_{RS})$ and $(-\dot{V}_{K'})$, respectively, and the resultant signal is received as the input signal $\dot{I}_N$, then transferred to a register D. Under this condition, when the instantaneous value of the electrical quantity $(\dot{I}\dot{Z}_{RS} - \dot{V}_{RS})$ is greater than the electrical quantity $(-\dot{V}_{K'})$, (that is, $\dot{I}\dot{Z}_{RS} - \dot{V}_{RS} > -\dot{V}_{K'}$), the stored content of the register D becomes "1".

When the stored content of the register C is "1" or the stored content of register D is "0", the procedure adds 1 to the count of the counter $K_R$, when otherwise, the count of the counter $K_R$ is reset to 0. When the count of the counter $K_R$ is greater than or equal to 90, the output $T_{M-RS}$ is caused to be "1", when otherwise, the output $T_{M-RS}$ is caused to be "0".

In FIG. 41, the condition under which the stored content of the register C becomes "1" is such that both the relationships of the electrical quantities $\dot{V}_{PRS} > +\dot{V}_K$ and $(\dot{I}\dot{Z}_{RS} - \dot{V}_{RS}) > +\dot{V}_{K'}$ hold. The equivalent condition to this in the case of the structure shown in FIG. 16, is those $\dot{V}_{PRS} > 0$ and $(\dot{I}\dot{Z}_{RS} - \dot{V}_{RS}) > 0$ hold. Here, the value of the electrical quantity $\dot{V}_K$ is sufficiently smaller than the magnitude of the electrical quantities $\dot{V}_{PRS}$ and $(\dot{I}\dot{Z}_{RS} - \dot{V}_{RS})$ obtained upon failures, so that the difference between the responses of the above-described cases in FIGS. 41 and 16 is insignificant. In either embodiments, when the count of the counter $K_R$ reaches greater than or equal to 90 the procedure causes the output $T_{M-RS}$ to be "1". Thus, the difference between both embodiments in terms of characteristic that causes the output $T_{M-RS}$ to be "1" is substantially negligible.

In FIG. 41, when both the relationships of the electrical quantities $\dot{V}_{PRS} < -\dot{V}_K$ and $(\dot{I}\dot{Z}_{RS} - \dot{V}_{RS}) < -\dot{V}_K'$ hold, the stored content of the register D is caused to be "0", and when that this status has continued 90 times is counted by the counter $K_R$, then the output $T_{M-RS}$ is caused to be "1". The condition under which the stored content of the register D becomes "0" appears in a reversed half wave symmetrical to the condition under which the stored content of the register C becomes "1". So the condition under which the stored content of the register D becomes "0" and the count of the counter $K_R$ reaches greater than or equal to 90 is equal to the condition under which the stored content of the register C becomes "1". For this reason, the characteristics of the embodiment in FIG. 41 become, upon failure, substantially similar to the characteristics of embodiment in FIG. 16. In addition, both the positive and negative half waves thereof are counted by the counter $K_R$, so that the operation time thereof becomes advantageously reduced.

In the embodiment of FIG. 41, both the voltage and current accidentally become zero due to power failure at a installation site of a current transformer or a potential transformer (also called a relay installation site) and also the electrical quantity $\dot{V}_{PRS}$ and $(\dot{I}\dot{Z}_{RS} - \dot{V}_{RS})$ become zero. In such a case the stored contents of the registers A and C will securely become "0", and the stored contents of the registers B and D will securely become "1", so that the procedure has no possibility to cause the output $T_{M-RS}$ to be "1". This is one of the significant advantages of the embodiment. In contrast to this, in the embodiment of FIG. 16, if the detecting levels of the comparators 19 and 20 deviate in a certain degree to negative under such condition described above, the system is in danger of causing both the stored contents of the registers A and B to be "1", thereby resulting in causing the output $T_{M-RS}$ to be "1". To prevent this, it is commonly experienced that an overcurrent relay is utilized together with the distance relay so as to cause the distance relay to operate the circuit breaker to perform proper interruption of the power system only when such over current relay operates. However, the embodiment in FIG. 41 does not need such manners.

In the embodiment of FIG. 41, the procedure changes the kinds or polarities of electrical quantities to be selected in the following step by the output signal of the comparator 19 in the step S41. This can reduce the number of steps in signal processing, thus can effectively minimize the burdens thereof.

In the aforementioned embodiments, all the control of the selecting circuits and amplifier circuits are made in accordance with the signals from the microcomputer circuit, however, the present invention is not limited to these systems, for example, even in such a following system, the effects thereof are not obstructed. Namely, there may be provided a system such that, besides the microcomputer circuit, control circuits are installed so as to control the selecting circuits and amplifier circuits, and to transfer the contents thereof to the microcomputer circuit. Further, the system is such that, in the case of a relay provided with certain specified functions, the control procedures of the selecting circuits or amplifier circuits can be made cyclically, so that there are provided, besides the microcomputer circuit, the control circuits of exclusive use for such control procedures, and by utilizing interrupt command signals the contents of control are transferred to the microcomputer circuit so as to judge whether the relay is to be operated.

As described above, according to the present invention, essentially numerous different characteristics of relay system can be realized, and there are also provided manners to adequately select the input electrical quantities, so that the protective relaying system capable of constituting a multi-function relay system provided with various characteristics or a polyphase relay system that performs the relay-operation judgment over specified polyphase can be readily realized smaller in system scale.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective relaying system which detects a fault in an electric power system having a circuit breaker by using a current and a voltage of said electric power system and causes said circuit breaker to trip in accordance with the fault detection so as to protect said electric power system, said protective relaying system, comprising:
    input conversion means adapted to receive a first input signal corresponding to said current and a second input signal corresponding to said voltage, for converting the magnitude and/or the phase of said first and second input signals to produce a first electrical quantity and a third electrical quantity, and for outputting said second input signal without conversion as a second electrical quantity,
    comparing means connected to receive said first, second and third electrical quantities for comparing said first electrical quantity with said second electrical quantity to produce a first logical state signal based on a first comparing result and comparing said third electrical quantity with a fourth electrical quantity to produce a second logical state signal based on a second comparing result cyclically, and for producing a logical state signal including said first and second logical state signals, cyclically; and
    digital data processing means connected to receive cyclically said logical state signal, for judging whether a specified logical condition between said first logical state signal and said second logical state signal holds for a predetermined number of times corresponding to a predetermined electrical angle during one cycle of said electric power system and for producing a protection relay output signal based on the judging result, said protection relay output signal being adapted for using to trip said circuit breaker.

2. The protective relaying system according to claim 1, wherein:
    said specified logical condition in said digital data processing means includes that a logical product of said first and second logical state signals is a predetermined logical value.

3. The protective relaying system according to claim 1, wherein:

said specified logical condition in said digital data processing means includes that an exclusive-or of said first and second logical state signals is a predetermined logical value.

4. The protective relaying system according to claim 1, wherein:
said specified logical condition in said digital data processing means includes a first condition that said first logical state signal is a predetermined logical value and a second condition that said second logical state signal is a predetermined logical value; and
said digital data processing means judges whether both of said first and second conditions hold for said predetermined number of times.

5. The protective relaying system according to claim 1, wherein:
said digital data processing means further includes AND circuit means connected to receive said first and second logical state signals for producing a logical product of said first and second logical state signals; and
said specified logical condition includes that said logical product is a predetermined logical value.

6. The protective relaying system according to claim 1, wherein:
said comparing means compares said third electrical quantity with said fourth electrical quantity based on a selection signal;
said digital data processing means further includes means for producing said selecting signal only when said first logical state signal is a predetermined logical value; and
said digital data processing means judges whether said logical condition holds for said predetermined number of times only when said selecting signal is produced.

7. The protective relaying system according to claim 1, wherein:
said digital data processing means judges whether said specified logical condition holds consecutively for said predetermined number of times.

8. The protective relaying system according to claim 1, wherein:
said comparing means receives as said fourth electrical quantity a DC reference voltage biased such an amount that said digital data processing means is prevented from misoperation when said third electrical quantity is not inputted.

9. The protective relaying system according to claim 1, wherein:
said comparing means receives zero volts as said fourth electrical quantity.

10. The protective relaying system according to claim 1, wherein:
said comparing means includes, first selecting means connected to receive said first and third electrical quantities for selecting cyclically one of said first and third electrical quantities to produce a first selection signal based on a first selecting signal,
second selecting means connected to receive said second and fourth electrical quantities for selecting cyclically one of said second and fourth electrical quantities to produce a second selection signal based on a second selecting signal, and
comparator means connected to receive said first and second selection signals for comparing cyclically said first selection signal with said second selection signal to produce said logical state signal based on the comparing result, said logical state signal including said first logical state signal when said first and second selecting means select said first and second electrical quantities, respectively and said second logical state signal when said first and second selecting means select said third and fourth electrical quantities, respectively; and
said digital data processing means includes means for producing said first and second selecting signals so as to receive said first and second logical state signals cyclically.

11. The protective relaying system according to claim 10, wherein:
said input conversion means produces an electrical quantity $\dot{I}\dot{Z}$ which is a vector product of said first input signal $I$ and a line impedance $\dot{Z}$ of said electric power system as said first electrical quantity, said second input signal $\dot{V}$ as said second electrical quantity, and a polar voltage $\dot{V}_P$ derived from said second input signal $\dot{V}$ as said third electrical quantity; and
said second selecting means receives a reference voltage as said fourth electrical quantity.

12. The protective relaying system according to claim 10, wherein:
said input conversion means produces an electrical quantity $\dot{I}\dot{Z}_{rs}$ which lags behind said first input signal by a predetermined electrical angle as said first electrical quantity, said second input signal $\dot{V}$ as said second electrical quantity, and an electrical quantity $\dot{I}\dot{Z}_{prs}$ which has the same phase as that of and has the amplitude proportional to that of a vector product of said first input signal $I$ and a line impedance $\dot{Z}$ of said electric power system as said third electrical quantity; and
said second selecting means receives a reference voltage as said fourth electrical quantity.

13. The protective relaying system according to claim 1 wherein:
said comparing means includes,
selecting means connected to said input conversion means for receiving said first, second and third electrical quantities, for receiving said fourth electrical quantity, for selecting cyclically one of said second, first, fourth and third electrical quantities in this order to produce a selection signal based on a selecting signal,
sample and hold means connected to said selecting means for receiving said selection signal and for sampling and holding said selection signal cyclically to produce a sample-held signal based on a control signal, and
comparator means connected to receive said selection signal and said sample-held signal for comparing cyclically said selection signal with said sample-held signal to produce said logical state signal based on a comparison result,
said logical state signal including said first logical state signal when said selecting means selects said first electrical quantity and said sample and hold means outputs said sample-held signal corresponding to said second electrical quantity and said second logical state signal when said selecting means selects said third electrical quantity and said sample and hold means outputs said sample-held signal corresponding to said fourth electrical quantity; and said digital data processing means includes means for producing said selecting signal so that said selecting means selects one of said second, first fourth and third electrical quantity cyclically, and means for producing said control signal so as to receive said selection signal corresponding to said second and fourth electrical quantities cyclically.

14. The protective relaying system according to claim 13, wherein:
said input conversion means produces an electrical quantity $\vec{IZ}$ which is a vector product of said input signal $\vec{I}$ and a line impedance $\vec{Z}$ of said electrical power system as said first electrical quantity, said second input signal $\vec{V}$ as said second electrical quantity, and a polar voltage $\vec{V}_P$ derived from said second input signal as said third electrical quantity; and
said selecting means receives a reference voltage as said fourth electrical quantity.

15. The protective relaying system according to claim 1, wherein said comparing means includes:
first comparator means connected to receive said first and second electrical quantities for comparing cyclically said first electrical quantity with said second electrical quantity to produce said first logical state signal based on said first comparing result; and
second comparator means connected to receive said third and fourth electrical quantities for comparing cyclically said third electrical quantity with said fourth electrical quantity to produce said second logical state signal based on said second comparison result.

16. The protective relaying system according to claim 1, wgerein said comparing means includes:
summing means connected to receive said first and second electrical quantities for summing said first electrical quantity and said second electrical quantity to produce a summed signal;
first comparator means connected to receive said summed signal for comparing said summed signal with a reference voltage to produce said first logical state signal based on said first comparison result; and
second comparator means conncted to receive said third and fourth electrical quantities for comparing said third electrical quantity with said fourth electrical quantity to produce said second logical state signal based on said second comparison result.

17. The protective relaying system according to claim 16, wherein:
said input conversion means produces an electrical quantity $\vec{IZ}$ which is a vector product of said first input signal $\vec{I}$ and a line impedance $\vec{Z}$ of said electrical power system as said first electrical quantity, an electrical quantity $(-\vec{V})$ which is the inverse of said second input signal $\vec{V}$ as said second electrical quantity, and a polar voltage $\vec{V}_P$ derived from said second input signal $\vec{V}$ as said third electrical quantity; and
said second comparator means receives a reference voltage as said fourth electrical quantity.

18. The protective relaying system according to claim 1, wherein:
said comparing means includes, first, second and third selecting means,
said first selecting means being connected to said input conversion means for receiving a first plurality of said electrical quantities including said first electrical quantity, and for selecting cyclically one of said first plurality of electrical quantities to produce a first selection signal based on a first selecting signal,
said second selecting means being connected to said input conversion means for receiving a second plurality of said electrical quantities including said second electrical quantity, and for selecting cyclically one of said second plurality of electrical quantities to produce a second selection signal based on a second selecting signal, and
said third selecting means being connected to said input conversion means for receiving a third plurality of said electrical quantities including said third electrical quantity, and for selecting cyclically one of said third plurality of electrical quantities to produce a third selection signal based on a third selecting signal;
said comparing means further includes,
summing means connected to said first and second selecting means for receiving said first and second selection signals and for summing said first selection signal and said second selection signal to produce a summed signal,
first comparator means connected to receive said summed signal for comparing cyclically said summed signal with a reference voltage to produce said first logical state signal based on said first comparison result, and
second comparator means connected to receive said third selecting signal, for receiving said fourth electrical quantity and for comparing cyclically said third selecting signal with said fourth electrical quantity to produce said second logical state signal based on said second comparison result;
and
said digital data processing means includes means for producing said first, second and third selecting signals so as to receive said first and second logical state signals cyclically.

19. A protective relaying system which detects a fault in an electric power system having a circuit breaker by using a current and a voltage of said electric power system and causes said circuit breaker to trip in accordance with the fault detection so as to protect said electric power system, said protective relaying system, comprising:
input conversion means adapted to receive a first input signal corresponding to said current and a second input signal corresponding to said voltage, for converting the magnitude and/or the phase of said first and second input signals to produce a first electrical quantity and a third electrical quantity, and for outputting said second input signal without conversion as a second electrical quantity, comparing means connected to receive said first, second and third electrical quantities for comparing said first electrical quantity with said second electrical quantity to produce a first logical state signal based on a first comparing result and comparing said first electrical quantity with said third electrical quantity to produce a second logical state signal based on a second comparing result cyclically, and for producing a logical state signal including said first and second logical state signals, cyclically; and
digital data processing means connected to receive cyclically said logical state signal, for judging whether a specified logical condition between said first logical state signal and said second logical state signal holds for a predetermined number of times corresponding to a predetermined electrical angle during one cycle of said electrical power system and for producing a protection relay output signal based on the judging result, said protection relay output signal being adapted for using to trip said circuit breaker;

said comparing means including, selecting means connected to receive said second and third electrical quantities for selecting cyclically one of said second and third electrical quantities to produce a selection signal based on a selecting signal, and comparator means connected to receive said first electrical quantity and said selection signal for comparing cyclically said first electrical quantity with said selection signal to produce said logical state signal based on the comparing result, said logical state signal including said first logical state signal when said selecting means selects said second electrical quantity, and said second logical state signal when said selecting means selects said third electrical quantity;

said digital data processing means including means for producing said selecting signal so as to receive said first and second logical state signals cyclically; and said input conversion means producing an electrical quantity $I\dot{Z}$ which is a vector product of said first input signal I and a line impedance $\dot{Z}$ of said electrical power system as said first electrical quantity, said second input signal $\dot{V}$ as said second electrical quantity, and an electrical quantity $(-1/k)\dot{V}_P$ which is a product of a polar voltage $\dot{V}_P$ derived from said second input signal and a minus constant $(-1/k)$ as said third electrical quantity.

20. A protective relaying system which detects a fault in an electric power system having a circuit breaker by using a current and a voltage of said electrical power system and causes said circuit breaker to trip in accordance with the fault detection so as to protect said electric power system, said protective relaying system, comprising:

input conversion means adapted to receive a first input signal corresponding to said current and a second input signal corresponding to said voltage, for converting the magnitude and/or the phase of said first input signal to produce a first electrical quantity, and for outputting said second input signal without conversion as a second electrical quantity;

amplifying means connected to said input conversion means for receiving said second electrical quantity for amplifying cyclically said second electrical quantity by an amplifying factor determined by a control signal to produce an amplified electrical quantity including a first and a second amplified electrical quantities;

comparator means connected to receive said first electrical quantity and said amplified electrical quantity for comparing cyclically said first electrical quantity with said amplified electrical quantity to produce a logical state signal based on the comparison result, said logical state signal including a first logical state signal when said amplifying means outputs said first amplified electrical quantity and a second logical state signal when said amplifying means outputs said second amplified electrical quantity; and digital data processing means connected to receive cyclically said logical state signal, for judging whether a specified logical condition between said first logical sate signal and said second logical signal holds for a predetermined number of times corresponding to a predetermined electrical angle during one cycle of said electric power system and for producing a protection relay output signal based on the judging result, said protection relay output signal being adapted for using to trip said circuit breaker, said digital data processing means further including means for producing said control signal so as to receive said first and second logical state signals cyclically.

21. The protective relaying system according to claim 20, wherein:

said input conversion means produces an electrical quantity $I\dot{Z}_X$ which leads said first input signal I by an electrical signal of 90° as said first electrical quantity; and said digital data processing means produces said control signal which causes said amplifying factors to be zero and a non-zero constant cyclically, said first and second amplified electrical quantities corresponding to said amplifying factors of said zero and said non-zero constant.

22. A protective relaying system which detects a fault in an electric power system having a circuit breaker by using a current and a voltage of said electric power system and causes said circuit breaker to trip in accordance with the fault detection so as to protect said electric power system, said protective relaying system, comprising:

input conversion means adapted to receive a first input signal corresponding to said current and a second input signal corresponding to said voltage and for converting the magnitude and/or the phase of said first and second input signals to produce a plurality of electrical quantities including a first and a third electrical quantities, and for outputting said second input signal without conversion as a second electrical quantity;

selecting means connected to said input conversion means for receiving said first and third electrical quantities for selecting cyclically one of said first and third electrical quantities to produce a selection signal based on a selecting signal;

amplifying means connected to receive said second electrical quantity for amplifying cyclically said second electrical quantity by an amplifying factor determined by a control signal to produce an amplified electrical quantity including a first and a second amplified electrical quantities;

comparator means connected to receive said selection signal and said amplified electrical quantity for comparing cyclically said selection signal with said amplified electrical quantity to produce a logical state signal based on the comparison result, said logical state signal including a first and a second logical state signals when said selecting means selects said first and third electrical quantities, respectively, and said amplifying means outputs said first and second amplified electrical quantities respectively; and digital data processing means connected to receive cyclically said logical state signal, for judging whether a specified logical condition between said first logical state signal and said second logical state signal holds for a predetermined number of times corresponding to a predetermined electrical angle during one cycle of said electric power system and for producing a protection relay output signal based on the judging result, said protection relay output signal being adapted for using to trip said circuit breaker, said digital data processing means further including means for producing said selecting signal and said control signal so as to receive said first and second logical state signal cyclically.

23. The protective relaying system according to claim 22, wherein:

said input conversion means produces a polar voltage $\dot{V}_P$ derived from said second input signal $\dot{V}$ as said first electrical quantity, and an electrical quantity $\dot{I}\dot{Z}$ which is a logical product of said first input signal $\dot{I}$ and a line impedance $\dot{Z}$ of said electric power system as said third electrical quantity; and said digital data processing means produces said control signal which causes said amplifying factor to be zero and a non-zero constant cyclically, said first and second amplified electrical quantities corresponding to said amplifying factors of said zero and said non-zero constant.

24. A protective relaying system which detects a fault in an electric power system having a circuit breaker by using a current and a voltage of said electric power system and causes said circuit breaker to trip in accordance with the fault detection so as to protect said electric power system, said protective relaying system, comprising:

input conversion means adapted to receive a first input signal corresponding to said current and a second input signal corresponding to said voltage, for converting the magnitude and/or the phase of said first and second input signal to produce a plurality of electrical quantities including a first and a second electrical quantities, and for outputting said second input signal without conversion as a third electrical quantity;

first selecting means connected to receive said first electrical quantity and a fourth electrical quantity for selecting one of said first and fourth electrical quantities to produce a first selection signal based on a first selecting signal;

second selecting means connected to receive said second and fourth electrical quantities for selecting one of said second and fourth electrical quantities to produce a second selection signal based on a second selecting signal;

third selecting means connected to receive said third and fourth electrical quantities for selecting one of said third and fourth electrical quantities to produce a third selection signal based on a third selecting signal;

first amplifying means connected to receive said first selection signal for amplifying said first selection signal by a first amplifying factor determined by a first control signal to produce a first amplified electrical quantity;

second amplifying means connected to receive said second selection signal for amplifying said second selection signal by a second amplifying factor determined by a second control signal to produce a second amplified electrical quantity;

summing means connected to receive said first and second amplified electrical quantities for summing said first and second amplified electrical quantities to produce a summed signal;

comparator means connected to receive said summed signal and said third selection signal for comparing said summed signal with said third selection signal to produce a logical state signal based on the comparison result;

each of said first, second and third selection signals, said first and second amplified electrical quantities and said summed signal including three values, respectively;

said logical state signal including a first, a second and a third logical state signals corresponding to said three values of each of said third selection signal and said summed signal; and digital data processing means connected to receive cyclically said logical state signal, for judging whether a specified logical condition among said first, second and third logical state signals holds for a predetermined number of times corresponding to a predetermined electrical angle during one cycle of said electric power system and for producing a protection relay output signal based on the judging result, said protection relay output signal being adapted for using to trip said circuit breaker, said digital data processing means further including means for producing said first, second and third selecting signals and said first and second control signals so as to receive said first, second and third logical state signals cyclically.

25. The protective relaying system according to claim 24, wherein:

said input conversion means produces and electrical quantity $\dot{I}\dot{Z}$ which is a logical product of said first input signal $\dot{I}$ and a line impedance $\dot{Z}$ of said electric power system as said first electrical quantity, an electrical quantity $\dot{I}\dot{R}$ which is a current being proportional and in-phase to said first input signal $\dot{I}$ as said third electrical quantity.

26. The protective relaying system according to claim 1, 20 or 21 wherein:

said digital data processing means further includes means for producing a delayed logical state signal based on said second logical state signal which lags behind said second logical state signal by a time corresponding to predetermined electrical angle; and said specified logical condition includes a logical condition between said first logical state signal and said delayed logical state signal.

* * * * *